(12) United States Patent
Okutani et al.

(10) Patent No.: US 7,583,313 B2
(45) Date of Patent: Sep. 1, 2009

(54) IMAGING APPARATUS

(75) Inventors: Tsuyoshi Okutani, Machida (JP); Tadashi Yokota, Yamato (JP)

(73) Assignee: Kyocera Corporation, Kyoto (JP)

( * ) Notice: Subject to any disclaimer, the term of this patent is extended or adjusted under 35 U.S.C. 154(b) by 1047 days.

(21) Appl. No.: 10/877,962

(22) Filed: Jun. 25, 2004

(65) Prior Publication Data
US 2005/0062876 A1    Mar. 24, 2005

(30) Foreign Application Priority Data

| Jun. 26, 2003 | (JP) | ............................. 2003-183622 |
| Jun. 26, 2003 | (JP) | ............................. 2003-183624 |
| Jun. 26, 2003 | (JP) | ............................. 2003-183625 |
| Jun. 26, 2003 | (JP) | ............................. 2003-183626 |
| Jul. 31, 2003 | (JP) | ............................. 2003-205201 |
| Aug. 26, 2003 | (JP) | ............................. 2003-208916 |
| Aug. 28, 2003 | (JP) | ............................. 2003-305567 |
| Aug. 29, 2003 | (JP) | ............................. 2003-307446 |

(51) Int. Cl.
*H04N 5/225* (2006.01)
*H04N 5/222* (2006.01)

(52) U.S. Cl. ...................... 348/373; 348/374; 348/376; 348/333.06

(58) Field of Classification Search ......... 361/680–683; 348/373, 375–376, 333.06; D16/211–212; 16/367, 337, 339
See application file for complete search history.

(56) References Cited

U.S. PATENT DOCUMENTS 4,967,072 A * 10/1990 Nishimura ............. 250/231.16

(Continued)

FOREIGN PATENT DOCUMENTS

JP    03-163965    7/1991

(Continued)

OTHER PUBLICATIONS

Jeff Kellet: Nikon Coolpix, posted Jun. 1, 2003 www.dcresource.com/reviews/nikon/coolpix_sq-review.*

(Continued)

*Primary Examiner*—Tuan V Ho
*Assistant Examiner*—Euel K Cowan
(74) *Attorney, Agent, or Firm*—Hogan & Hartson LLP

(57) ABSTRACT

An imaging apparatus which is thin in thickness and has enough strength to be able to be accommodated in the breast pocket of one's shirt or back pocket of one's pants or in a handbag without bothered by a feeling of strangeness is provided. The imaging apparatus is composed of an imaging unit and an operation unit, both units being connected rotatably relative to each other by a hinge mechanism and formed into a low-profile, rectangular shape in the normal state in which the units are positioned parallel to each other. The operation unit is composed of an upper and a lower cover, a main board having a memory slot and an accommodation part for a flat type battery respectively on both flat faces thereof is contained inside the covers, the main board being supported by a main board supporting part or parts provided at a corner or corners inside the covers, a display is located on the memory slot side, and a control board of the imaging unit is located sideward adjacent to the battery accommodation part of the main board.

8 Claims, 20 Drawing Sheets

U.S. PATENT DOCUMENTS

| | | | | |
|---|---|---|---|---|
| 5,491,507 | A * | 2/1996 | Umezawa et al. | 348/14.02 |
| 5,758,529 | A * | 6/1998 | Chhatwal | 70/423 |
| 6,081,969 | A * | 7/2000 | Tanahashi et al. | 16/337 |
| 6,642,462 | B2 * | 11/2003 | Ninomiya et al. | 200/61.7 |
| 6,922,212 | B2 * | 7/2005 | Nakakubo et al. | 348/373 |

FOREIGN PATENT DOCUMENTS

| | | |
|---|---|---|
| JP | 04-158682 | 6/1992 |
| JP | 04-264799 | 9/1992 |
| JP | 07-023259 | 1/1995 |
| JP | 08-046372 | 2/1996 |
| JP | 08-102879 | 4/1996 |
| JP | 08-186768 | 7/1996 |
| JP | 09-102681 | 4/1997 |
| JP | 10-4513 | 1/1998 |
| JP | 10-215396 | 8/1998 |
| JP | 11-261859 | 9/1999 |
| JP | 11-355626 | 12/1999 |
| JP | 2001-211366 | 8/2001 |
| JP | 2001-298646 | 10/2001 |
| JP | 2002-035230 | 2/2002 |
| JP | 2002-62572 | 2/2002 |
| JP | 2002-077687 | 3/2002 |
| JP | 2002-82378 | 3/2002 |
| JP | 2002-222641 | 8/2002 |
| JP | 2002-299786 | 10/2002 |
| JP | 2002-320120 | 10/2002 |
| JP | 2003-134364 | 5/2003 |
| JP | 2003-219247 | 7/2003 |

OTHER PUBLICATIONS

Digital Camera Magazine, Mar. 1, 2003, p. 70 (with English Translation of noted items on page).

* cited by examiner

IMAGING APPARATUS

BACKGROUND OF THE INVENTION

1. Field of the Invention

The present invention is related to an imaging apparatus such as electronic camera capable of storing images picked up by an image pickup device in an integrated memory or in an outside memory, particularly to an imaging apparatus such as an electronic camera in which an operation unit provided with a display is hinged to an imaging unit to which a high magnification optical zooming system is mounted so that the operation unit is rotatable relative to the imaging unit and which is constructed as a small-sized, low-profile, light weight, and user-friendly camera.

2. Description of the Related Art

With an electronic camera provided with an image pickup device such as a CCD and capable of memorizing images as digital data, pictures photographed can be seen immediately without developing, printing, etc. An image pickup devices such as a CCD is becoming smaller-sized than a film roll year by year in spite of increasing number of pixels per image, so there is an advantage in an electronic camera that the camera itself can be constructed in small size and with high precision.

An electric camera is desired which is, for example, thin in thickness and has enough strength so that it can be accommodated in the breast pocket of one's shirt or in the back pocket of one's pants and is light weighted so that it does not cause uncomfortable feeling even if it is accommodated in such a place as mentioned above or in a handbag and furthermore is provided with a high magnification zooming mechanism.

However, when an electronic camera is constructed such that the lens unit is protruded from the camera body as is the case with a conventional camera using a rolled film, it is difficult to make the thickness of the camera thinner than a certain thickness because of the zooming mechanism and thickness of the lens unit even in the case of a lens unit sinking type camera.

A zoom lens is composed such that one or more groups of lenses among a plurality of groups of lenses disposed on an optical axis are moved along the optical axis to change the focal distance of the zoom lens. As a means to move the lens group or groups when zooming, generally a cam plate is provided to be engaged with the lens group or groups, and the lens group or groups are moved according to the cam shape by moving or rotating the cam plate by hand or by means of a motor, etc. in order to move the lens group or groups under correlation between two or more of the lens groups.

As a cam mechanism of this kind, there is conventionally a mechanism in which a ring-shaped cam(hereafter referred to as a cam ring) is fit coaxially on the outer circumference of the lens-barrel, the lens groups are engaged with the ring cam, and the lens groups are moved by rotating the ring cam around the axis of the lens-barrel. There is also a zooming mechanism in which a lead screw is provided along the optical axis of the lens-barrel, the lens group or groups to be moved are screwed into the lead screw, and the lens group or groups screwed in the lead screw is moved in the direction of the optical axis by rotating the lead screw by means of a motor, etc.

Therefore, it is impossible to compose the camera body thinner in the direction of optical axis than the height of the ring cam or the sum of the thickness of each of a plurality of lenses when the lenses are disposed in the front part of the camera body and the cam ring is fit on the circumference of the lens-barrel as mentioned above, even if it is composed so that all the lenses can be drew back into the camera body by switching off electric source to leave no protruding part remained in the front of the camera body. Further, the zoom lens consists of a plurality of lens groups as mentioned above, so the number of lenses increases with increased magnification, the sum of the thickness of lenses becomes fairly large, and it is difficult to compose a camera small in thickness Also, there is a problem that when the cam ring is provided on the outer circumference of the lens-barrel, the diameter of the lens unit becomes large resulting in an increased size of camera, which is an impeding factor for designing a low-profile camera.

However, there has appeared a camera having structure with which the increase in the thickness of camera with increased magnification is suppressed.

For example, in a lens unit sinking type camera in which a plurality of lenses are accommodated in the camera body when not photographing, a structure is adopted in which when the main electric source is shut off to accommodate the protruded lens groups in the body, lens group A located near intermediate position among a plurality of lens groups to be moved along the optical axis is moved off to a range outside the optical axis range to be accommodated in the camera body. Lens group B located in a position toward subject side from the intermediate position is accommodated in the camera body in the optical axis range.

Therefore, the thickness of the camera in the direction of the optical axis can be reduced by moving lens group A located near intermediate position to a range outside the optical axis range.

However, in the camera composed to move the lens group located near the intermediate position to the range outside the optical axis range, the structure is complicated for securing accuracies of optical groups as the lens groups must be moved off to the range outside the optical axis range, and the number of component parts increases for moving off the lens groups to the range outside the optical axis range, resulting in an increase in manufacturing cost.

Further, with a camera in which intermediate lens groups or lens-barrel is immersed in the camera body by switching off the main electric source, it takes a certain time until shooting pictures becomes possible because it takes a certain time until the lens groups are protruded after the main electric source is switched on, and photo opportunity may be missed.

With a camera in which a lead screw is provided along the optical axis of the lens-barrel, the number of component parts can be reduced by eliminating the cam ring, etc. resulting in a reduction in space near the lens-barrel compared with the case the cam mechanism is used, and weight saving of the camera is possible.

As to zooming mechanism, as disclosed in Japanese Laid-Open Patent Application No. 4-158682 and No. 7-23259 for example, it is thinkable to compose such that the optical axis is determined in a longer side or shorter side direction of a pocket notebook type camera which is provided with a display on its foldable cover, a window for taking pictures is provided in the lower side of the camera body, the light incoming through the window is reflected by a reflecting mirror disposed to incline at 45° to the window to be launched into the lens groups of which the optical axis is directed in a longer side or shorter side direction of the camera body, and the reflected light is again reflected by a reflecting mirror disposed to incline at 45° to the optical axis to be launched into an image pickup device disposed parallel to the optical axis (see Japanese Laid-Open Patent Application No. 4-158682) or such that a display is provided on one flat face of an pocket notebook type camera, a window is provided in the side face of the camera body, lens groups are disposed in the camera body with its optical axis directed in a longitudinal direction of the camera body (see Japanese Laid-Open Patent Application No. 7-23259), thus the full length of optical group is accommodated in the camera body.

However, generally this type of camera is provided with a plurality of lenses parallel to the display for displaying images photographed or to be photographed, reflectors or prisms are provided between the lenses behind the first lens to face the subject to be shot to change the light axis by 90°, and the subject is shot with the face of the display directed in the direction parallel to the direction toward the subject. With this composition, the number of component parts is reduced and downsizing of camera can be achieved, on the other hand, reflectors or prisms are necessary and the structure becomes complicated, which results in an increase in weight and cost, so downsizing or low-profiling compared to the case of a camera provided with a cam mechanism is not conspicuous.

A camera is proposed in Japanese Laid-Open Patent Application No. 11-261859 and No. 2002-320120, in which an imaging unit provided with a set of lenses, a finder, a light emitting apparatus, etc. is connected rotatably by a rotation mechanism such as a hinge mechanism to an operation unit provided with a display in order to make it possible to direct the imaging unit to a subject to be shot by rotating it with the display directed to the user. With this composition of an electric camera, the user can check the image on the display while directing the imaging unit to the subject even when the subject is the user him-or-herself or a subject near the ground.

In Japanese Patent No. 2931907 is disclosed a camera, in which an imaging unit provided with lenses, an image pickup device, and light emitting apparatus is connected rotatably to a camera body provided with a display such as a liquid crystal, the imaging unit can be turned to be directed to a subject to be photographed while directing the display to the user when taking pictures, and the imaging unit is turned to the position with which the unit is parallel to the display to be accommodated in the camera body when not shooting. By this construction, a reduction in the thickness in the direction perpendicular to the display of the camera body is achieved.

However, with a camera such as disclosed in Japanese Laid-Open Patent Application No. 4-158682 or No. 7-23259, there is a problem in addition to the problem mentioned above that, although it is possible to see the display when the window for taking pictures is directed to a subject to be shot at the level of user's eyes, it is difficult to check the coverage of picture on the display when shooting the user him-or-herself or a subject near the ground or over the heads of a crowd because the display is disposed on the opposite side of the window for taking pictures, and the user has no choice but to shoot by the seat of his pants. The camera disclosed in Japanese Laid-Open Patent Application No. 7-23259 is composed such that the surface of the display is parallel to the light axis, so when shooting with the camera held at the level of user's eyes, the user can check the coverage of picture on the display, but it is difficult to check the coverage of picture on the display when shooting with the camera held at the position lower than the level of user's eyes.

The camera disclosed in Japanese Laid-Open Patent Application No. 11-261859 or No. 2002-320120 is of a structure in which the operation unit and imaging unit is divided along the shorter side direction, so the image displaying plane area is inevitably small, and when this type of camera is composed to be a low-profile camera(thin-model camera), operation buttons protrude on the flat surface of the camera in addition to that the rigidity of the camera is reduced. Further, as the battery housing portion of the operation unit is thick compared with other portions and it becomes a grip portion. Due to the operation buttons and grip portions, it is difficult to get the camera in and out of the breast pocket of one's shirt or back pocket of one's pants smoothly.

Further, in the camera, although the zoom button is positioned on the same plane as the display, shutter release button and other operation buttons and command dials are positioned on the surface of the camera. Therefore, the operation buttons and command dials can not be operated by a user's thumb but need to be operated by his forefinger or other fingers, and further to operate those buttons while viewing the display is not possible.

With the camera disclosed in Japanese Laid-Open Patent Application No. 11-261859 or No. 2002-320120, if the photographed image on the display is held always in the same state thereon, a vertically inverted image is displayed on the display when the lens and the display is turned to face toward the user in order to shoot him-or-herself while checking the image to be shot on the display.

Further, the camera disclosed in Japanese Patent No. 2931907 is also composed such that the operation unit accounts for a large portion of the whole of the camera, a recess is formed in the front side of the operation unit for accommodating the imaging unit in order to secure a large display area, and the imaging unit can be accommodated rotatably in the recess, so that, although the downsizing of the camera can be achieved, whole camera body becomes too thick to be capable of being accommodated in the breast pocket of one's shirt or back pocket of one's pants.

Further, with the electronic camera composed such that the imaging unit integrating the lens and image pickup device is rotatable relative to the camera body provided with the display as disclosed in said Japanese Patent No. 2931907, it is possible to shoot the user him-or-herself by rotating the imaging unit toward the user (hereafter, this shooting is referred to as self-portrait shooting), however, when practicing self-portrait shooting, the user him-or-herself carries the camera and object distance is limited within 1 m. Therefore, the image of the user him-or-herself is displayed on the display as a large image and magnification should be adjusted each time of self-portrait shooting.

With the camera with a zoom lens like this, the zoom lens may be deteriorated in precision by a vibration caused by carrying around the camera, but if this happens, it is possible that the zoom lens is reset to eliminate the deterioration in precision by allowing it to return to initial setting when the lens is drawn back in the camera body by switching off the electric source in the case of a lens unit sinking type camera. However, with a camera of which the lens is drawn back when not shooting, a certain time is necessary before shooting is ready after the electric source is switched on, that is, start-up time is long, and it may happen to lose photo opportunity.

Further, with the electronic camera composed such that the camera is divided into an operation unit provided with the display and an imaging unit provided with a zoom lens, and the whole length of the optical system does not change when focal distance is changed by composing so that both the units are connected to be rotatable relatively to each other as mentioned above, start-up time after the electric source is switched on can be reduced because the zoom lens can be held in the state of focal distance as when last shooting was practiced. However, when deterioration in precision in the zoom lens is caused by vibration, the zoom lens is not reset and there may happen that the image of photograph is deteriorated.

SUMMARY OF THE INVENTION

In the light of the above-mentioned problems, one of the objects of the present invention is to make an imaging apparatus such as an electronic camera thinner.

To solve the problems mentioned above, as one of the embodiment of the invention the present invention proposes an imaging apparatus having an operation unit which is provided with a display and an imaging unit which is provided with a flash unit and a zoom lens, the imaging unit being connected rotatably to said operation unit by a hinge mechanism and images photographed being sent to said display, characterized in that the apparatus is configured to be thin in thickness by composing such that the housing of said operation unit is composed of an upper and a lower cover, a main board is supported inside the housing by main board supporting parts at a corner or a plurality of corners inside the covers, a memory slot is provided on one surface of the main board and a flat type battery accommodating part is provided on the other surface of the main board, said display is located to the memory slot side of the main board, and a control board of the imaging unit is located sideward of said battery accommodating part.

By composing the operation unit of the imaging apparatus like this, the operation unit can be composed to have a thickness of the sum of thicknesses of the display and the main board provided with the memory slot and battery accommodating part on both faces thereof. Therefore, a low-profile imaging apparatus that can be slipped into the breast pocket of one's shirt or back pocket of one's pants is provided.

As one of the embodiments of the invention, a support pillar is provided to one of the upper or lower cover or to both of the covers composing the housing of the operation unit to pass through the holes provided near the center of the main board to hold the main board in place loosely to accommodate to a case distortion occurs in the housing, so that even in case the apparatus is dropped through carelessness for example and the housing is temporarily deformed, the main board is not deformed. Therefore, such a trouble that the CPU, etc. mounted on the main board is removed off from the board can be prevented.

In one embodiment of the invention, either of the upper or lower cover composing the housing of the operation unit is provided with a rib extending in the direction of the optical axis in the imaging unit in the state both units are positioned in parallel with each other and the other cover is provided with a rib extending in the direction perpendicular to the optical axis, and the main board is pinched loosely by the ribs, so that even in case the apparatus is dropped through carelessness for example and the housing is temporarily deformed, the main board is not deformed. Therefore, such a trouble that the CPU, etc. mounted on the main board is removed off from the board can be prevented.

Further, an imaging apparatus as one of the embodiments is an apparatus having an operation unit which is provided with a display and an imaging unit which is provided with a flash unit and a zoom lens, the imaging unit being connected rotatably to said operation unit by a hinge mechanism and images photographed being sent to said display, characterized in that the width of the operation unit and the length of the optical system in the imaging unit are confined on the basis of the height of a battery located in the operation unit, a lens drive mechanism and a control board of the imaging unit are located in the side space of the imaging unit, and at least an electrical component is located in the space behind the optical system.

Hereafter, terms to indicate the figuration of the housing of the imaging apparatus is based on the state the imaging unit and operation unit are disposed parallel to each other, the lens window side of the imaging unit and the shutter release button side of the operation unit are denoted as the front side of each unit, the length from the front side to rear side of each unit is denoted as the width of each unit, the length from the end of the imaging unit to the end of the operation unit is denoted as the length of the camera, and the face on which the display is located is denoted as the surface.

Here, that " . . . are confined . . . " means that the housing is composed so that its width is narrower than a certain value by composing such that the width of the housing is not wider than the sum of heights of the battery and the buttons located in front of the battery and further the length the optical system in the imaging unit is determined such that a space can be secured behind the optical system for locating electrical components so that the width of the camera does not increase owing to the length of optical system. Therefore, the width of the housing is confined to be narrower than a certain value and the low-profile housing can be provided. Further, as the lens drive mechanism is located in the sideward space of the imaging unit, the lens of small diameter can be used not as the case with the prior art in which the diameter of zoom lens must be increased due to the cylindrical cam necessary to drive the zoom lens. Therefore, a low-profile imaging apparatus can be provided. Further, by locating the imaging unit side control board sideward adjacent to the lens drive mechanism and locating at least an electrical component for the flash unit in the space behind the optical system, the inside space of the imaging unit is effectively utilized and when, for example, a wider magnification of zooming is required, it can be easily realized with the imaging apparatus which can be accommodated in the breast pocket of one's shirt or back pocket of one's pants without being bothered by a feeling of strangeness.

By locating said battery in the operation unit in the end side opposite to the imaging unit, and confining the length of the imaging apparatus by the sum of the widths of the battery, flash unit, and optical system, that is, by configuring the imaging apparatus such that its length does not largely exceed the sum of the widths of the battery, flash unit, optical system, and an additional width of operation buttons as necessary, the length of the imaging apparatus is confined by the sum of the widths of the components absolutely necessary to compose the apparatus such as the battery which is necessary to drive the apparatus and must have a certain level of width when composed in a low-profile battery, width of the flash unit which is composed to be oblong in relation to horizontal to vertical ratio of the picture plane, width of the lens system indispensable to a camera, and width necessary to locate operation buttons on the operation unit. Therefore, the length (longer side length of the rectangular shaped imaging apparatus) can be reduced to a minimum and small sized imaging apparatus can be provided.

The imaging apparatus, as one embodiment of the invention is characterized in that it has a low-profile, rectangular shape in the state the housing of the operation unit connected rotatably with the housing of the imaging unit takes a normal rotation position relative to the imaging unit, a shutter release button is located on the operation unit side longer side side-face of the rectangular housing, the lens window of said zoom lens is located on the imaging unit side of said longer side side-face of the rectangular housing, said display is located on the operation unit side surface of the rectangular housing, and a linear protrusion is formed on the imaging unit side surface of the rectangular housing parallel to the longer side of the rectangular housing.

According to the invention like this, the imaging apparatus can be slipped into or out of a limited space such as a pocket easily and smoothly, and the back and forth and left and right of the camera can be confirmed by touching the linear protrusion on the imaging unit with fingers before it is ascertained visually when drawing the camera out of the pocket. Therefore, the user can be ready for shooting without delay. Further, the linear protrusion serves to protect the display provided on the operation unit.

In a preferable embodiment of the invention, operation buttons used when shooting are located on the surface of the operation unit in the front side of the display parallel to said linear protrusion on the imaging unit, and the height of each operation button from the surface of the rectangular housing is higher than that of the display and lower than that of the linear protrusion.

It is preferable that a mode selection button for selecting a variety of modes is located on the surface of the operation unit in the front side of the display parallel to said linear protrusion on the imaging unit, and that a zoom button to zoom the image on the display is located on the surface of the operation unit near said mode selection button. It is also preferable that a crisscross button(4-way button) is located on the surface of the operation unit near to the display apart from the shutter release button located on the front side side-face of the operation unit so that the shutter release button can be operated by the forefinger and the zoom button, mode selection button, and crisscross button can be operated by the thumb of the user.

To solve the problems mentioned above, one embodiment of of the invention having an operation unit which is provided with a display and an imaging unit which is provided with a flash unit and a zoom lens, the imaging unit being connected rotatably to said operation unit by a hinge mechanism and images photographed being sent to said display is characterized in that the front part of the imaging unit where a lens window is positioned is extended toward the operation unit to form a protruded portion for mounting a flash unit, and the distance to the rotation center of the hinge mechanism from the front side(lens window side) is greater than that from the rear side of the camera.

As the imaging unit is composed such that the lens window side(front side) portion of the imaging unit is protruded toward the operation unit side to provide the flash unit in said portion, the width of the housing can be reduced, and as the distance to the rotation center of the hinge mechanism from the lens window side (front side) is greater than that from the rear side, the rotation radius of the lens window side is relatively large, and a relatively large distance is secured between the display and lens window when both the display and lens window are directed in the same direction, that is, when shooting a self-portrait. Therefore, an imaging apparatus of good usability can be provided.

By composing such that the width of said protruded part of the imaging unit in which the flash unit is mounted is about the thickness of the forefinger and the length from the lens window side end to the end of the protruded portion is about the length from the tip of the forefinger to the second joint thereof so that the front part including the protruded part can be pinched by the forefinger and middle finger to turn the imaging unit, the imaging apparatus of the invention can be held by holding the operation unit by the right hand and the imaging unit can be turned to the subject to be shot by pinching the front part thereof including the protruded portion thereof. Therefore, the imaging apparatus of good usability can be provided.

By composing such that the distance from the lens window side of the imaging unit to the rotation center of the hinge mechanism is determined to be such a length that the viewing field on the display is not constricted by the presence of the protruded portion in front of the display when the lens window of the imaging unit is turned to the display side of the operation unit, the user can shoot a self-portrait while viewing self image on the display without hindered by the protruded portion of the image pickup portion.

The hinge mechanism is featured in comprising an imaging unit side hinge plate fixed to the imaging unit, a hinge shaft fixed to said hinge plate of imaging unit side and having a flange on which a pattern is provided for detecting the rotation angle of the hinge shaft, a hinge plate of operation unit side fixed to the operation unit, the hinge plate supporting the hinge shaft so that the hinge shaft is rotatable and prevented from slipping out from the hinge plate, an elastic member placed between the flange and hinge plate of operation unit side, and a photoelectric device for detecting the relative rotation angle of the imaging unit to the operating unit by sensing the pattern provided on the flange to detect the rotation angle of the imaging unit relative to the operating unit can be detected.

By composing the imaging apparatus such that the rotation of the imaging unit is detected by the pattern for detecting the rotation angle provided on the flange of the hinge shaft of the hinge mechanism and the photoelectric device which is simple and inexpensive, the rotation angle can be easily detected, and as the photoelectric device can be located at some distance from the hinge shaft, mechanical junction and wiring are not required resulting in easy assembling, and a breakage in the wiring cable can be eliminated. Further, as there is no need to provide a switch to the hinge mechanism, it is possible to downsize the hinge mechanism and a compact imaging apparatus can be provided.

By providing concaves on the flange of the hinge shaft of the hinge mechanism at a certain angle spacing, using a circular spring as said elastic member, and forming protrusions on the circular spring so that the protrusions are engaged into the concaves to allow the imaging unit to be held in position, the imaging unit can be held in place relative to the operation unit, and an imaging apparatus which is easy to handle can be provided.

By forming reinforcement portions on the back of the protrusions of the circular spring, development of cracks in the back faces of the protrusions, which might occur due to the pressing force between the imaging unit and operation unit when the protrusions come out of the concaves due to the rotation of the imaging unit, can be prevented.

By providing a control means which performs controlling of performing initial setting of the zoom lens toward a wide-angle side when the power is turned on and controlling of increasing zoom magnification of the zoom lens in accordance with the output of the detecting means for detecting the relative rotation angle of the imaging unit to the operation unit, even if deterioration in precision in the zoom lens is caused due to vibration, etc., the deterioration can be corrected by the resetting of the initial setting of the zoom lens 10 performed upon turning on the power, and in addition, as zoom magnification is increased from the wide-angle side when shooting, adjustment of magnification is not necessary by stopping the increase of magnification at a desired magnification. Therefore, an imaging apparatus of good usability can be provided.

By providing a control means which performs selectively controlling of performing initial setting of the zoom lens toward a wide-angle side or controlling of increasing zoom magnification of the zoom lens in accordance with the output of the detecting means for detecting the relative rotation angle of the imaging unit to the operation unit detected that the lens window is turned to the display surface side of the display and with the output thereof detected that lens window is turned to opposite to the display surface, zoom magnification is increased from the wide-range side and can be stopped at a desired magnification whereby adjustment of magnification is not required when shooting a self-portrait, and when shooting other than a self-portrait, even if the zoom lens is deteriorated in precision due to vibration, etc., the deterioration can be corrected by the resetting of the zoom lens to the initial setting. Therefore, an imaging apparatus of good usability can be provided.

By providing a control means which performs controlling of to set the zoom lens toward a wide-range angle side or controlling to change to increase zoom magnification of the zoom lens selectively depending on whether the output of the detecting means for detecting the rotation angle of the imaging unit relative to the operation unit detected that the lens window is turned to the display surface side of the display (self-portrait shooting) or detected that lens window is turned to opposite to the display surface(other than self-portrait shooting), adjusting of zoom magnification becomes not necessary by allowing zoom magnification to increase from the wide-range angle side and stopping at a desired magnification when shooting self-portrait, and when shooting other than self-portrait, even if the zoom lens is deteriorated in precision due to vibration, etc., the deterioration can be corrected by initializing the zoom lens to the wide-range angle side. Therefore, an imaging apparatus of good usability can be provided.

By providing the memorizing means to store said zoom magnification and allowing the control means to change said zoom magnification according to the zoom magnification stored in said memorizing means, shooting is done with optimum zoom magnification so that the user does not need to be concerned about zoom magnification.

By calculating by said control means the focal distance of the zoom lens using the distance from the camera to the subject to be shot calculated based on the signal from the focusing means of the zoom lens and the predetermined magnification and allowing the control means to stop changing zoom magnification at the calculated focal distance, shooting can be done by keeping the image on the display always to a certain size either when shooting a self-portrait with the camera held by the hand of the user or fixed to a tripod. Therefore, an imaging apparatus of very good usability can be provided.

BRIEF DESCRIPTION OF THE DRAWINGS

FIG. 6 is a perspective view showing the state the covers of the operation unit 102 of an embodiment of the electronic camera 100 is removed and further FIG. 6(A) the sate that the display 105 are removed.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
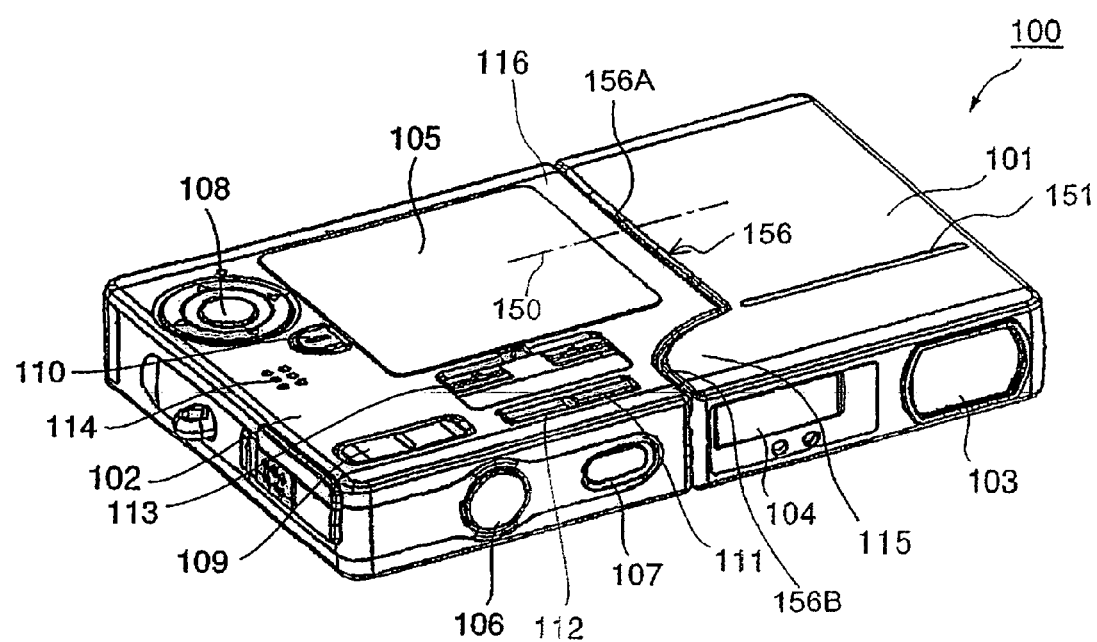
FIG. 1 is an external view of an embodiment of the electronic camera according to the present invention.

In the drawings, the each of the same constituent parts is marked with identical numeral. FIG. 1 is an external view of an embodiment of the electronic camera according to the present invention, FIG. 2 is a view when the lens of the electronic camera according to the present invention is directed toward a subject to be shot, FIG. 3 is a view when the lens of the electronic camera according to the present invention is directed toward the operator of the camera, and FIG. 4 is a representation showing the state of holding the camera when shooting is practiced with the lens of the electronic camera according to the present invention is directed toward a subject to be shot.

Figure 2:
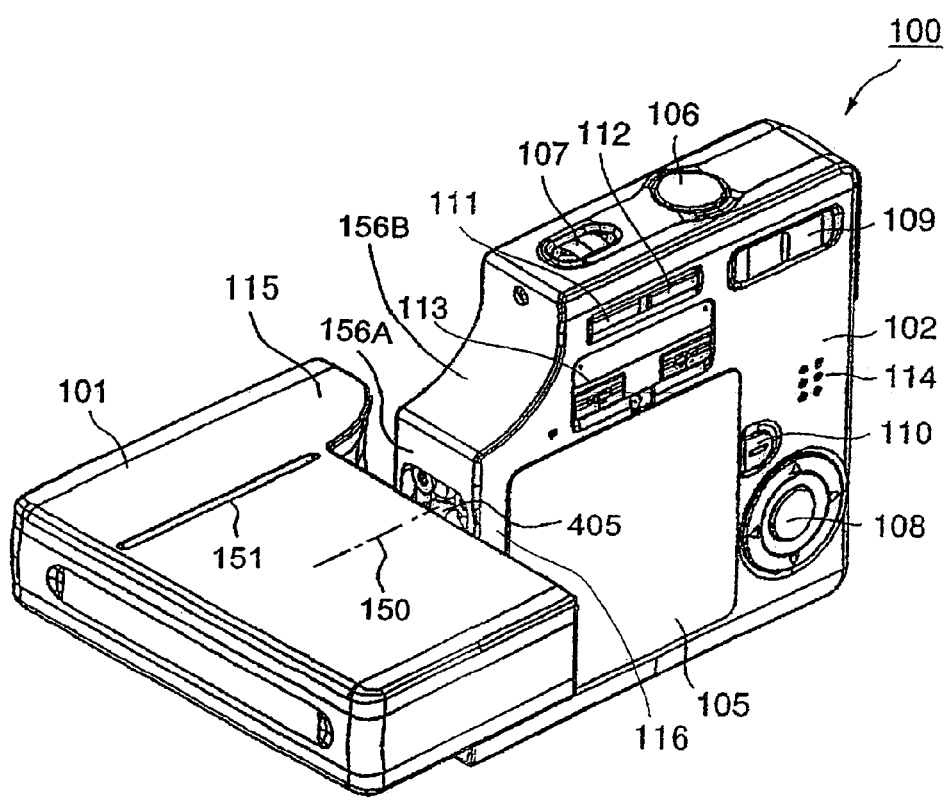
FIG. 2 is a view when the lens of the electronic camera according to the present invention is directed toward an object of shooting.
Figure 3:
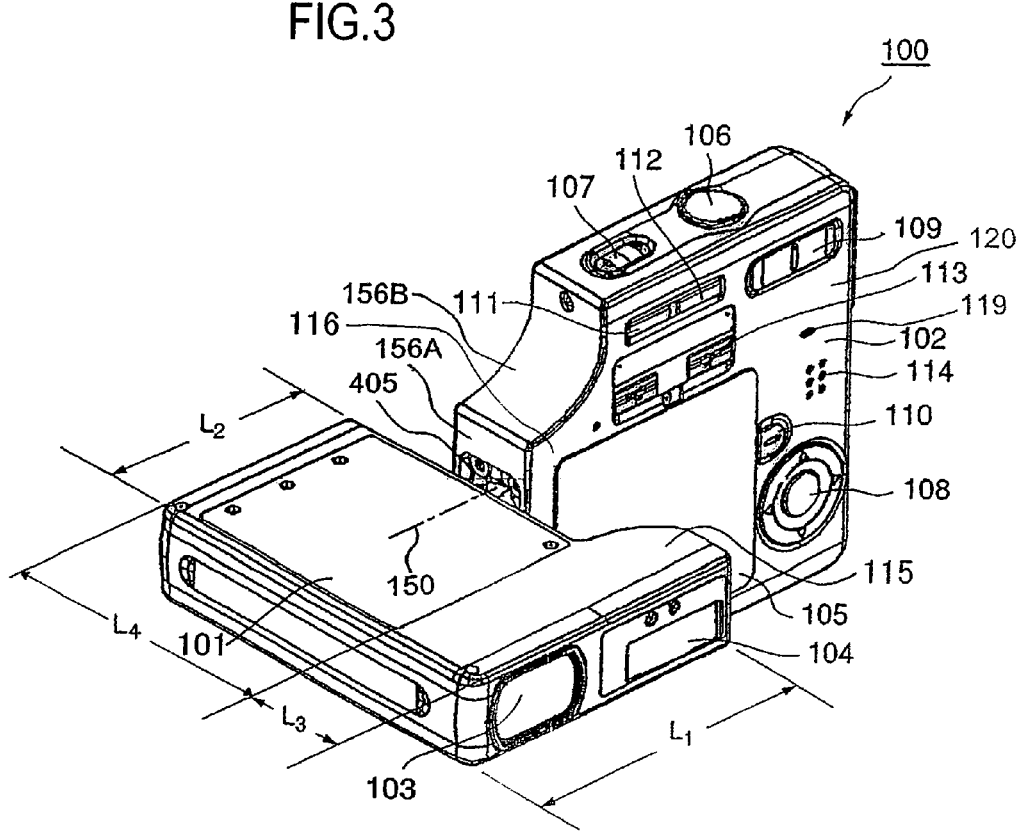
FIG. 3 is a view when the lens of the electronic camera according to the present invention is directed toward the user of the camera.
Figure 4:
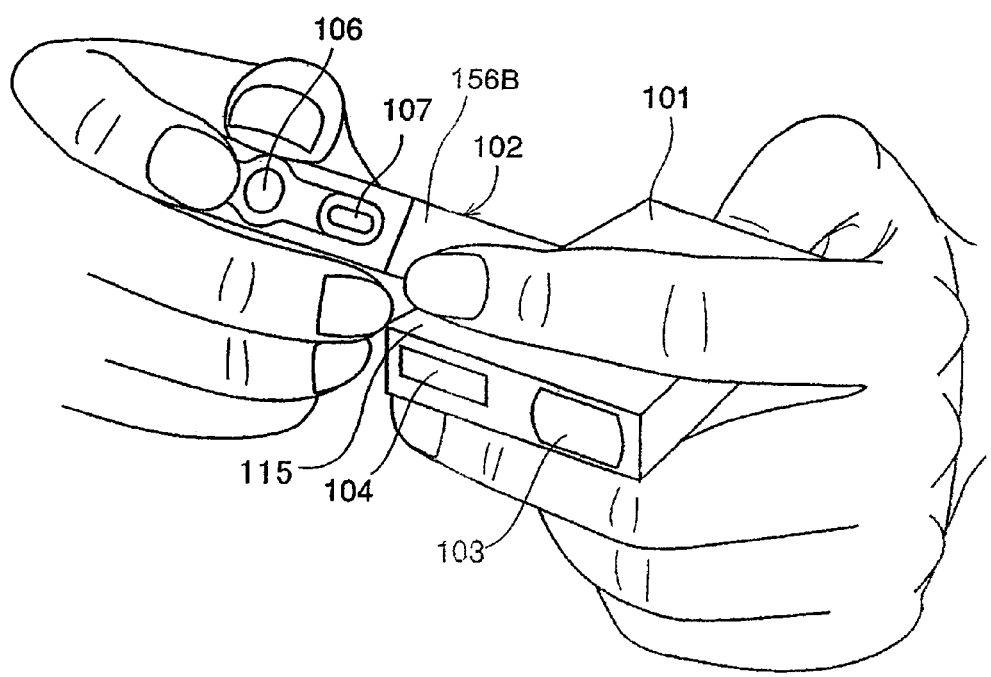
FIG. 4 is a representation showing the state of holding the camera when shooting is practiced with the lens of the electronic camera according to the present invention is directed toward an object of shooting.

The electronic camera 100 as one embodiment of the present invention is composed, as shown in FIG. 1 to 3, such that an imaging unit 101 and an operation unit 102 are connected to be rotatable relative to each other. A lens window 103 behind which zoom lens is provided and a flash window 104 for emitting strobe light are provided to the imaging unit 101. A cam mechanism is provided adjacent to the zoom lens for shifting lens groups composing the zoom lens, and electrical components such as a condenser, etc. not shown in FIG. 1 to 3 are provided in the back space of the zoom lens and cam mechanism, i.e. in the rear side of the lens window 103. The operation unit 102 are provided with a display 105 such as that made of liquid crystal; a shutter release button 106; a power button 107; a selection & setting button 108 composed of a 4-way button(crisscross button) and a setting button for the selection and determination of a function or item among those presented on the display 105; a zoom button 109 for determining optical zooming; a menu button 110 for changing over camera modes; a display button 111 for changing over displayed content and on-off of lighting of the display 105; a scene button 112 for changing over the content presented on the display 105 to a scene selecting screen page; and a mode selection button 113 for selecting modes such as the aperture priority mode, shutter priority mode, sport mode to shoot a subject moving with high speed, macro mode to shoot a subject in a short range, strobe control mode for forced strobe lighting or shutdown of lighting, moving picture photographing mode, or playback mode. A large distance is secured between the selection & setting button 108 and zoom button 109 to form a space 120 for placing the thumb of the user to hold the camera, speaker holes 114 and a microphone 119 being located in the space 120.

The housing of the electronic camera 100 as one embodiment of the invention is formed into a thin rectangular shape with the imaging unit 101 integrating a lens mechanism connected to the operation unit provided with the display 105 and buttons 106~113. On a longer side of the housing side surface is located the shutter release button 106 on the operation unit 102 side and the lens window 103 on the side of the imaging unit 101. The housing is split into the imaging unit 101 and operation unit 102 along demarcation plane 156 so that both units can be turned relatively to each other around a rotation axis 150 parallel to the longer sides of the camera housing. A linear protrusion 151 is formed on the surface of the imaging unit 101 parallel to the rotation axis 150, and the buttons 108, 109, 110, 111, 112, and 113 are provided such that they protrude higher than the surface of the display 105 and lower than said linear protrusion 151. Therefore, the buttons on the operation unit do not interfere with the edge of the breast pocket of one's shirt or the back pocket of one's pants when slipping the camera into the pocket and do not cause uncomfortable feeling.

The demarcation plane 156 consists of a straight plane 156A extending parallel to the shorter side plane of the housing in the region toward rear side from the linear protrusion 151 and a curved plane 156B in the region toward front side from the linear protrusion 151 to form a first protruding portion 115 of the imaging unit projecting toward the operation unit 102. The lens window 103 and flash window 104 are located on the front side plane of the first protruding portion 115 of the imaging unit 101. The first protruding portion 115 is configured such that length $L_1$ is determined to be a length from the tip of left hand forefinger to near the second joint thereof, the width $L_3$ is determined to be about the thickness of the forefinger, and the imaging unit 101 can be turned around the rotation axis 150 without interfering with the operation unit 102.

The operation unit 102 is formed to have a second protruding portion 116 so that the imaging unit side side-face of the operation unit is formed to correspond with the demarcation plane 156A and curved demarcation plane 156B of the imaging unit 101, and the display 105 is located on the surface of the operation unit to extend to the second protrusion portion 116. With this configuration, the display 105 can be formed to have a relatively large area and a space to locate operation buttons 106~113 can be secured in the right below of the display 105 in FIG. 1. Therefore, an electric camera of small size with excellent operability can be composed according to the present invention.

In a region of the operation unit 102 in front of the display, where apart is recessed to correspond with the first protruding portion 115 of the imaging unit 101, are located the zoom button 109 for determining optical zooming; a display button 111 for changing over displayed content and on-off of lighting the display; a scene button 112 for changing over the content presented on the display 105 to a scene selecting screen page; and a mode selection button 113 for selecting modes such as the aperture priority mode, shutter priority mode, sport mode to shoot a subject moving with high speed, macro mode to shoot a subject in a short range, strobe light control mode for forced flashing or shutdown of flashing, moving picture photographing mode, and playback mode. In the area left side of the display 105 in FIG. 1 are located a menu button 110 for changing over on and off of the camera mode menu which is not needed when shooting; and the selection & setting button 108 composed of a 4-way button and a setting button for the selection and determination of a function or item among those presented on the display 105. A large distance is secured between the selection & setting button 108 and zoom button 109 to form a space 120 for placing the thumb of the user to hold the camera, speaker holes 114 and a mike hole 102 being located in the space 120. By providing the space 120, miss operation caused by touching other buttons when shooting can be prevented.

The demarcation plane 156B in the front side the camera housing is positioned at approximately where the longer side of the rectangular-shaped camera housing is bisected, and the lens window 103 and flash window 104 are located on the front side plane of the imaging unit 101. The rotation axis 150 around which the imaging unit 101 can be turned is offset a certain distance rearward from the center line of the shorter side of the rectangular shaped camera housing.

The shutter release button 106 is located on the front side plane of the operation unit 102 side of the rectangular shaped camera housing so that the shutter release button can be operated by the thumb of the user when the camera is held by his right hand. The zoom button 109, selection & setting button 108, menu button 110, and mode selection button 113 are located in the range the thumb of the user can reach when the camera is held by his or her right hand, thus user-friendliness can be achieved. Further, the buttons 106 and 109 used mainly when shooting are located aside from the display 105 so that fingers of the user do not touch the display when shooting.

The imaging unit 101 of the electronic camera 100 as one embodiment of the invention can be turned to face toward a subject to be shot as shown in FIG. 2 or turned inversely to allow the lens window to face toward the user him-or-herself to make self-portrait shooting possible while directing the display 105 toward the user so that the picture on the display is always visible to the user.

In the electronic camera 100 as one embodiment of the invention, the distance to the rotation axis of the hinge mechanism from the front side(lens window 103 side) is longer than that from the rear side of the housing. Therefore, when shooting a self-portrait by facing the lens window to the user him/herself, the distance from the display to the lens window 103 side is relatively long. Accordingly, the user can view whole or almost whole display area by shifting or tilting the camera only slightly because the front side end of the first protruded portion 115 of the imaging unit is relatively remote from the face of the display 105.

When taking photo with the electronic camera 100 as one embodiment of the invention, the power button 107 is pushed to switch on the electric source, then operation buttons are operated by the thumb of the user as mentioned before to select the aperture priority mode or shutter priority mode, sport mode for shooting a subject moving with high speed, macro mode for shooting a subject in a close range, strobe light control mode for forced strobe lighting or shutdown of lighting, moving picture photographing mode, or playback mode. The menu button 110 is pushed as necessary to allow a variety of menus such as the size of picture, sensitivity, photometry to be displayed and desired item can be selected by the selection & setting button 108 composed of 4-way button and a setting button and determined by pushing the setting button in the center of the selection & setting button 108.

When shooting with the lens window 103 directed toward the subject to be shot as shown in FIG. 2, the operation unit 102 is held by the right hand while pinching the first protruded portion 115 of length $L_1$ and width $L_3$ by the forefinger and middle finger of the left hand of the user, for example, to turn the imaging unit 101 so that the lens window 103 is directed toward the subject. The zoom button 109 in the operation unit 102 is operated with the thumb of right hand to determine desired magnification and picture composition, and then the shutter release button 106 is pushed by the forefinger of right hand, with which focusing and exposure are automatically set and the image taken by the image pickup device such as the CCD integrated in the imaging unit 101 is stored in the memory integrated in the camera housing.

As the distance from the lens window 103 to the rotation axis of the hinge mechanism is longer than that from the rotation axis to the side face opposite to the lens window 103 as mentioned before, the radius of rotation of the lens window is large, and the imaging unit 101 can be swiftly turned while holding the camera 100 securely when shooting in the way like this.

With the electronic camera 100 as one embodiment of the invention, self-portrait shooting is also possible by rotating the lens window 103 of the imaging unit 101 to direct toward the user him/herself as shown in FIG. 3. In this case, the first protruding portion 115 comes in front of the display 105, but as the distance from the lens window 103 to the rotation axis of the hinge mechanism is longer than that from the rotation axis to the side face opposite to the lens window 103 so that the sight of the display from the user is not largely hindered by the protruding portion 115, self-portrait shooting can be done while ascertaining the pose of him/herself on the display 105.

When shooting is over, the images memorized in the memory can be displayed on the display 105 by operating the mode selection button 113 to the playback mode. The images can be displayed sequentially on the display 105 by operating the 4-way button of the selection & setting button 108. When the mode is set to the moving picture mode, the moving picture is memorized in the memory in the same way and desired scene can be selected by the scene button 112, and recorded sound can also be played back by the speaker 114.

With the composition like this, the camera can be accommodated also in the tight pocked such as that of the back pocket of pants as the linear protrusion 151 serves as a guide. Further, as the linear protrusion 151 formed to extend on the surface between the rotation axis 150 and lens window 103 in the imaging unit 101 parallel to the rotation axis 150, the back and forth and left and right of the camera can be confirmed by touching before it is ascertained visually when drawing the camera out of the pocket. Therefore, the user can be ready for shooting without delay. Further, the linear protrusion 151 serves to protect the display 105 provided on the operation unit 102.

The height of each of the operation buttons located on the surface on which the display 105 is provided of the operation unit 102 is lower than that of the linear protrusion, so they do not interfere with the edge of a tight pocket when drawing the camera out of the pocket. When accommodating the camera in a pocket, generally the camera is slipped into the pocket with a shorter side of the rectangular shaped camera housing ahead, so the linear protrusion 151 serves as a guide when slipping the camera into the pocket, and the camera can be put into the pocket with ease.

Further, by locating the mode selection button 113, which is used not frequently when shooting, near at least to the one of the sides of the rectangular display 105 parallel to the side, the mode selection button 113 serves as a protecting wall of the display 105, and as the mode selection button 113 is located near the display, the position of the mode selection button 113 is clear, which contributes to prevent miss operation of the mode selection button 113. By providing the mode selection 113 on a line extending from the linear protrusion 151, a protecting wall can be formed along at least one of the side line of the display 105.

The demarcation plane 156 dividing the imaging unit 101 and operation unit 102 is defined such that the dividing plane 156A extends linearly toward the rear side of the housing from the linear protrusion 151 parallel to the shorter side plane of the housing and the curved dividing plane 156B intrudes into the operation unit 102 to form the first protruding portion 115 for the imaging unit 101, and the operation buttons are located on the surface of the operation unit 102 in the front area which is in the extension of the first protruded portion 115 of the imaging unit 101, so that the operation unit 102 of the low-profile camera can be held by the right hand with the first protruded portion 115 pinched with the forefinger and middle finger of the user to allow the imaging unit 101 to be turned to direct the lens window 103 toward the subject to be shot. Thus, a low-profile, user-friendly(easily operated) electric camera can be provided which can be held by hands securely when shooting.

Further, as the imaging unit 101 is rotatable relative to the operation unit 102 around the rotation axis 150 parallel to the longer side of the rectangular shaped housing, the imaging unit 101 can be turned by an action of the wrist of left hand in the state the first protruded portion 115 is pinched with the forefinger and middle finger of the left hand while holding the operation unit 102 with the fingers of right hand with the right hand wrist fixed, and the display 105 can be viewed by the user. The zoom button 109 is located at the area where the thumb of right hand can touch to operate zooming easily. As a result, as the direction of movement of the thumb of right hand to operate operation buttons is perpendicular to that of the wrist of left hand to turn the imaging unit 101, the camera can be operated very smoothly.

Further, as the imaging unit 101 which is turned by turning the wrist of left hand and the operation unit 102 which is held by the right hand with the wrist fixed are divided into two low-profile shape to form a thin rectangular shape when the two units are positioned parallel to each other, the camera is easy to hold with both hands even if it is configured with a longer side length of 90~110 mm, shorter side length of 55~700 mm, and thickness of 10~18 mm, a size about the same as that of a pass case, for accommodation for example in the breast pocket of one's shirt or back pocket of one's pants. When the imaging unit 101 is held by left hand and the operation unit 102 is held by right hand, zooming can be done with ease by operating the zoom button 109 located in the recess formed in a position just front side of the space 120 for placing the thumb of right hand, and an electronic camera of good usability can be provided.

By providing the first protruding portion 115 to the imaging unit 101 so that the lens window side portion protrude in the operation unit 102, the flash window 104 can be located side by side with the lens window 103 on the lens window side side-plane of the imaging unit 101 even with the small sized camera. In the operation unit 102, the display 105 can be provided to extend beyond the curved demarcation line 156B on the surface of the operation unit in the rear side area thereof, which allows ample area for the display 105. There remains a space on the surface in the front side of the display, and operation buttons can be located in a range the thumb of the user can reach. As a result, when the operation unit 102 is held by the right hand of the user, the operation buttons are easily touched by the thumb, resulting in a user-friendly electronic camera.

Figure 5:
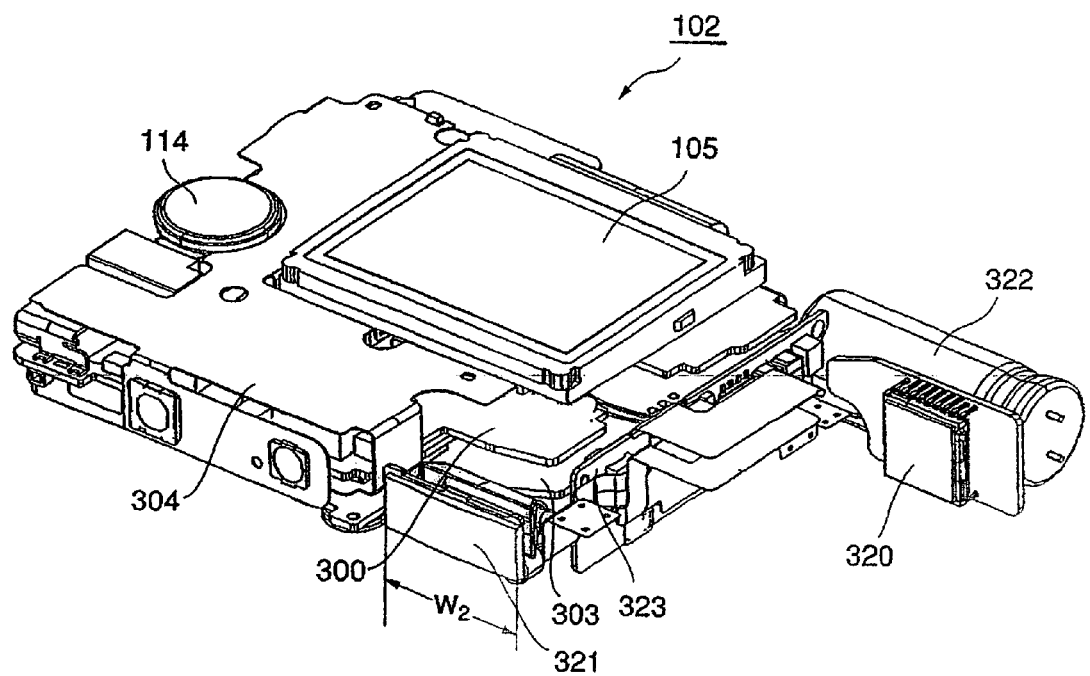
FIG. 5 is a perspective view showing the state the cover of the operation unit 102 of an embodiment of the electronic camera 100 is removed to show the device accommodated therein, and showing the imaging apparatus such as a light emitting apparatus and condenser, CCD etc. in the imaging unit 101.
Figures 6A, 6B:
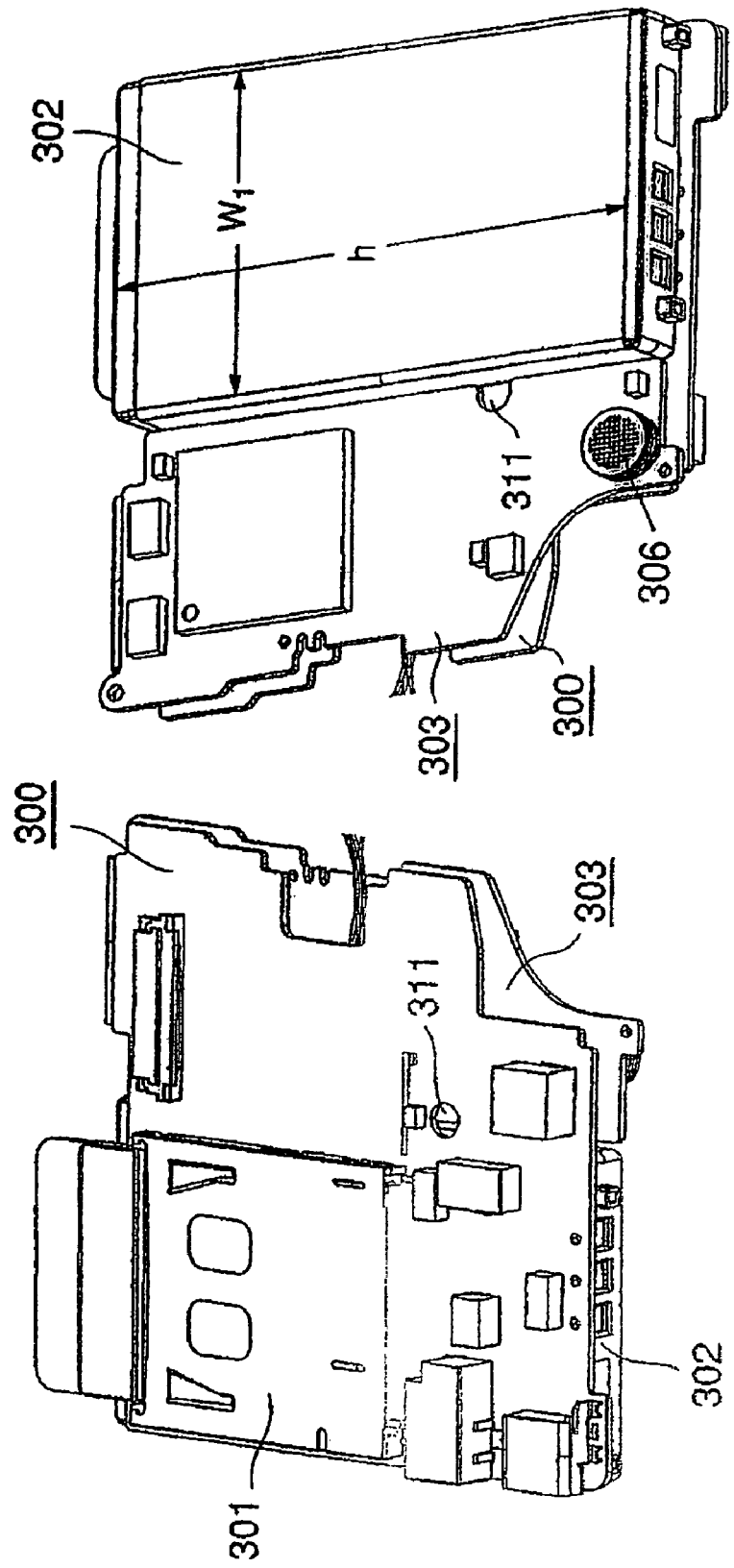
FIG. 6(B) is a perspective view of the rear side thereof.
Figure 7A:
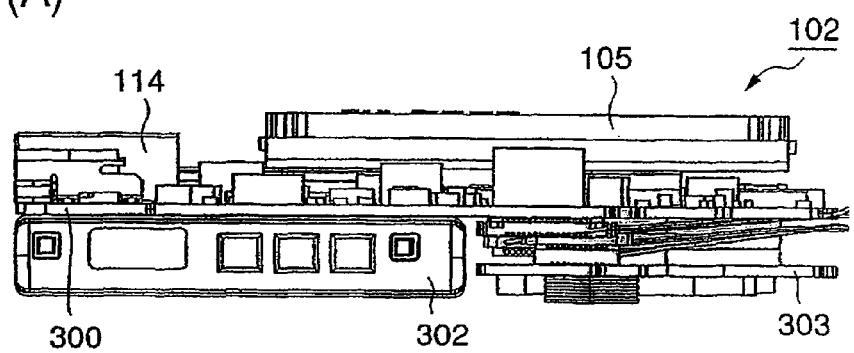
FIG. 7(A) is a front view(viewed from frontward in FIG. 5) showing the state the covers of the operation unit 102 of an embodiment of the electronic camera 100 are removed.
Figure 7B:
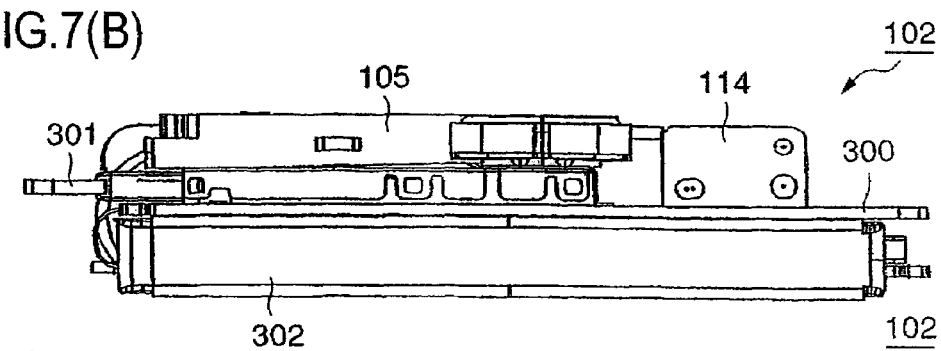
FIG. 7(B) is a rear view in FIG. 5.
Figure 7C:
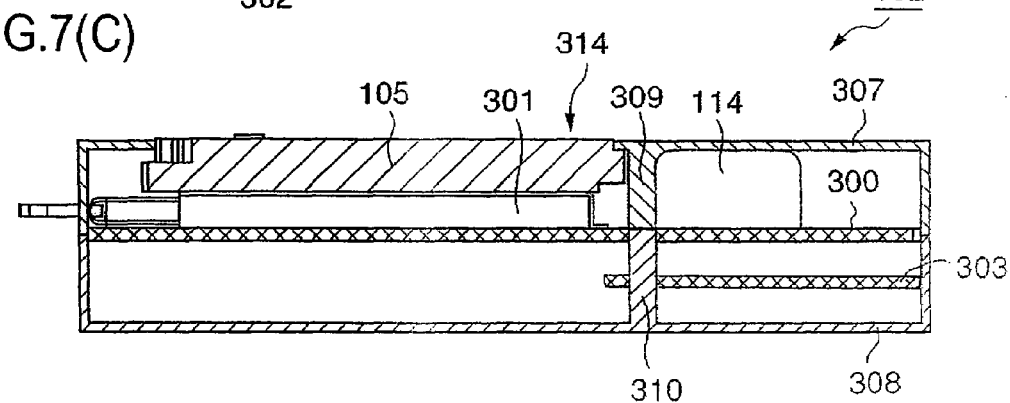
FIG. 7(C) is a section along the line passing through the center of a hole 311 near the center of the main board 300 in FIG. 6(A) with the upper and lower covers attached and viewed from rear side in FIG. 5.
Figure 8:
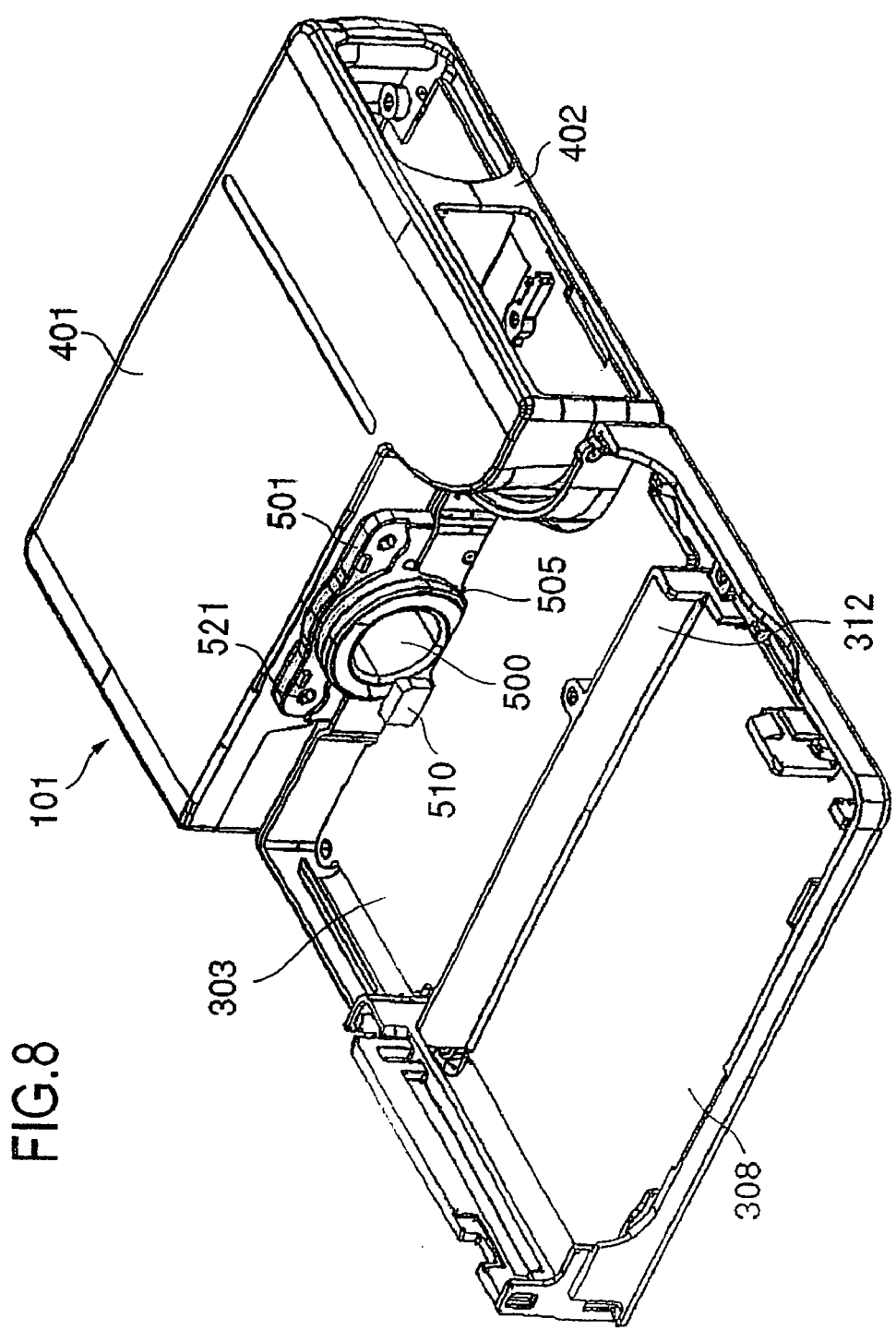
FIG. 8 is a perspective view showing the state the hinge mechanism 405 is attached to the imaging unit 101 of an embodiment of the electronic camera 100 and the upper cover and internal constituent parts are removed from the operation unit 102 to show the hinge portion.

Next, the composition of the operation unit will be explained. FIG. 5 is a perspective view showing the state the cover of the operation unit 102 of one embodiment of the electronic camera 100 according to the present invention is removed to show the device accommodated therein, and showing the imaging apparatus such as a light emitting apparatus and condenser, CCD etc. in the imaging unit 101, FIG. 6(A) is a perspective view showing the state the covers of the operation unit 102 of an embodiment of the electronic camera 100 are removed and further the display 105 is removed, and FIG. 6(B) is a perspective view of the rear side thereof. FIG. 7(A) is a front view(viewed from frontward in FIG. 5) showing the state the covers of the operation unit 102 of an embodiment of the electronic camera 100 are removed, FIG. 7(B) is a rear view in FIG. 5, and FIG. 7(C) is a section along the line passing through the center of a hole 311 near the center of the main board 300 in FIG. 6(A) with the upper and lower covers attached and viewed from rear side in FIG. 5. FIG. 8 is a perspective view for explaining the hinge mechanism for jointing the imaging unit 101 to the operation unit 102 with the lower cover 308 partially cutaway, and FIG. 9 is a partial sectional view for explaining the structure of the supporting portion of a main board 300 in the operation unit 102.

Figure 9:
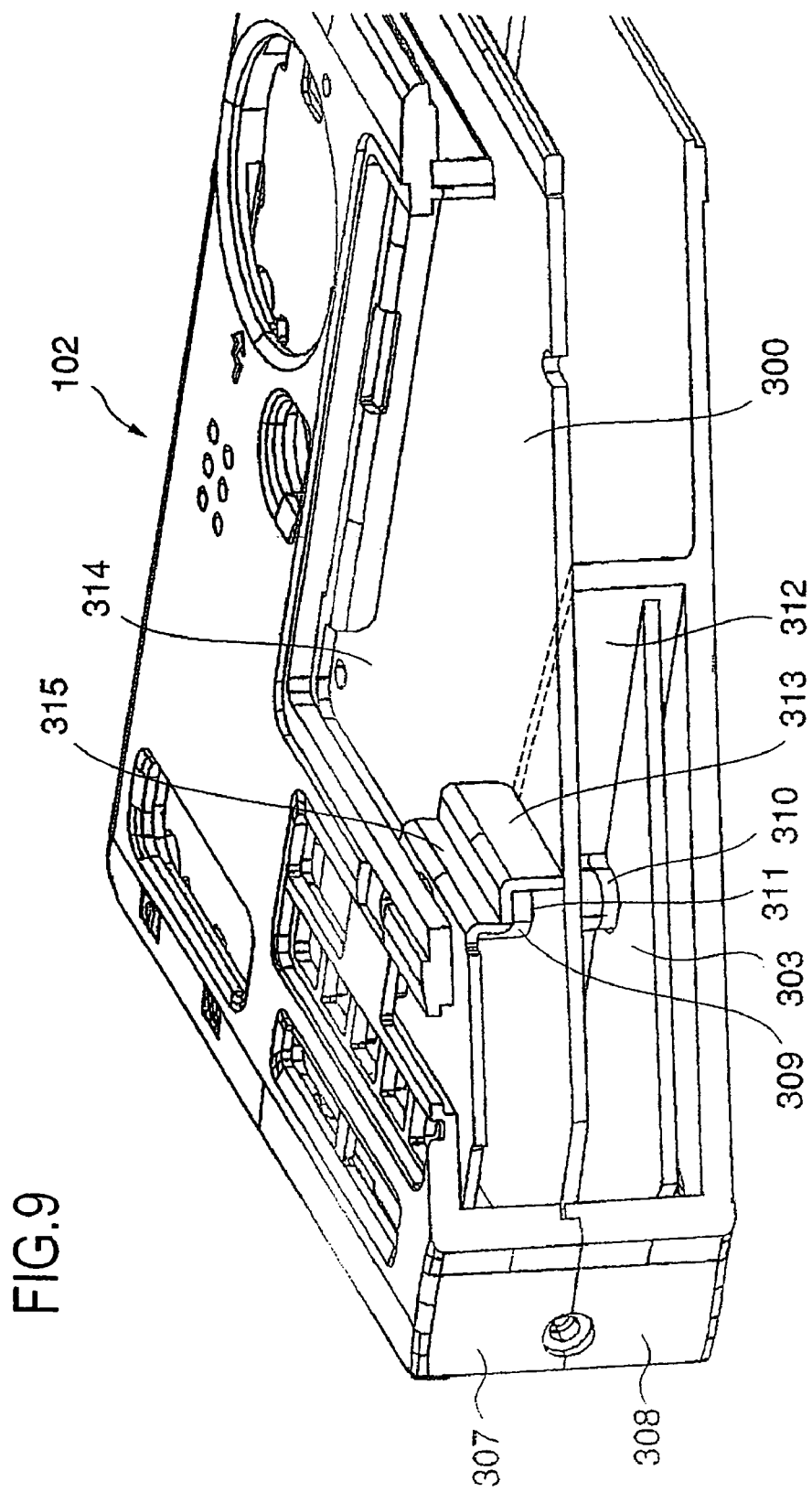
FIG. 9 is a partial sectional view for explaining the structure of the supporting portion of a main board 300 in the operation unit 102.

In the operation unit 102 of the electronic camera 100 of one embodiment of the invention is provided, as shown in FIG. 5 to FIG. 9, a main board 300 for controlling whole functions of the camera, on a surface of which are provided a memory slot 301(see FIG. 6(A), FIGS. 7(B) and (C)) for inserting memory card, etc. to memorize images and a display (see FIG. 5 and FIG. 7), on the other surface of which are provided a flat type battery 302(see FIG. 6(B) and FIG. 7) and a sub-board 303 to control the imaging unit 101, further a flexible board 304 to control modes is located between the memory slot 301 and display 105, and a microphone 306 is located on the sub-board 303. The housing of the operation unit 102 is composed of an upper cover 307 and a lower cover 308. Each of the upper cover 307 and the lower cover 308 has respectively a support pillar 309, 310 which penetrate a hole 311(see FIG. 6 and FIG. 9) provided in the main board 300 near the center thereof as shown in the sectional view of FIG. 7(C). The lower cover 308 of the operation unit 102 has a rib 312 extending in its central part in the direction of the optical axis(in the direction of the axis of the lens unit provided in the imaging unit 101 in the state it is shown in FIG. 8) as shown in FIG. 8, the rib being for supporting the main board 300. The upper cover 307 has a rib 313 extending perpendicular to the rib 312 under a display bearing member 315 at an opening 314 for allowing the display to be exposed as shown in FIG. 9, the rib 313 serving to hold-down the main board 300.

On the upper cover 307 shown in FIG. 7(C) in a sectional view are attached a speaker 114, and operation buttons such as the shutter release button 106, power button 107, selection & setting button 108, zoom button 109, menu button 110 display button 111 scene button 112, and mode selection button 113 as shown in FIG. 1. The upper cover 307 has an opening 314 for providing the display 105 made of liquid crystal, etc. as shown in FIG. 5, and the flexible board 304 for mode controlling is placed around the display 105. The main board 300 is located under the flexible board 304 and the display 105, the main board 300 being provided with the slot 301 to insert a memory card for storing images, etc. on a surface thereof as shown in FIG. 6(A) and provided with the flat type battery 302 on the other surface thereof as shown in FIG. 6(B). The boards are stacked as shown in FIG. 7(B), and further, the sub-board 303 is located by the side of the battery 302 placed under the main board 300. In FIG. 5, reference numeral 320 is an image pickup device such as a CCD, 321 is a flash unit, 322 is a condenser for the flash unit for emitting strobe light, 323 is a printed board for the flash unit, these are located in the imaging unit 101.

The main board 300 is positioned and supported by main board supporting parts provided at a corner or a plurality of corners not shown in the drawings inside the lower cover 308, further supported by the rib 312 formed in the lower cover 307 extending in the direction of axis of the lens unit as shown in FIG. 8 and FIG. 9, and the support pillar 309 provided in the upper cover 307(see FIG. 7(C)) and the support pillar 310 provided in the lower cover 308(see FIG. 7(C) and FIG. 9) fit in the through hole 311 provided in the main board 300 near the center thereof, and the rib 313 extending perpendicular to the rib 312 hold-down the main board 300, thus the main board 300 is supported inside the upper and lower cover so that the main board 300 is supported loosely inside the housing of the operation unit to be free from the distortion of the housing. The main board 300 is mounted with a CPU, etc. to control the whole function of the electronic camera 100, so the electronic camera configured in a low-profile is slipped into the pocket of one's shirt or pants as mentioned before, the housing composed of the upper cover 307 and lower cover 308 may be subjected to a large deflection, and in case the camera is dropped through carelessness, the housing may be deformed. Therefore, if the main board 300 mounted with a CPU, etc. is fixed to the housing with screws, etc., the deflection or deformation of the housing causes deflection in the main board 300, and in the worst case the CPU, etc. mounted on the main board may be damaged. In the present invention, the main board 300 is supported loosely in the housing of the operation unit 102 as mentioned above so that the main board 300 is free from deflection when the housing is deflected.

Figure 10:
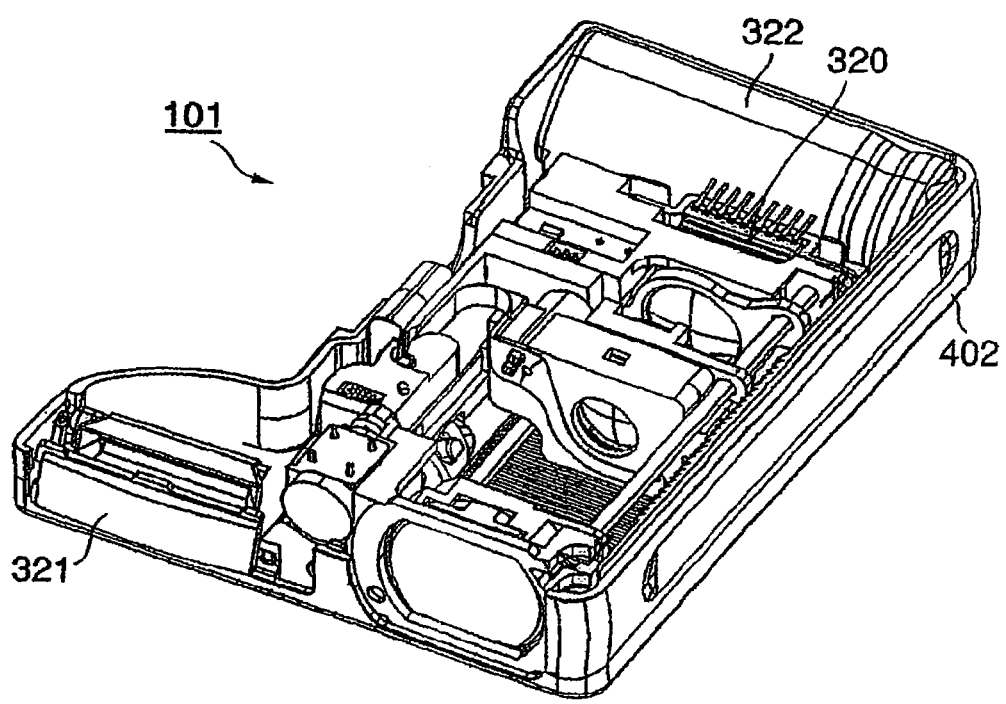
FIG. 10 is a perspective view of the imaging unit of an embodiment of the electronic camera according to the present invention with the upper cover thereof is removed.
Figure 11:
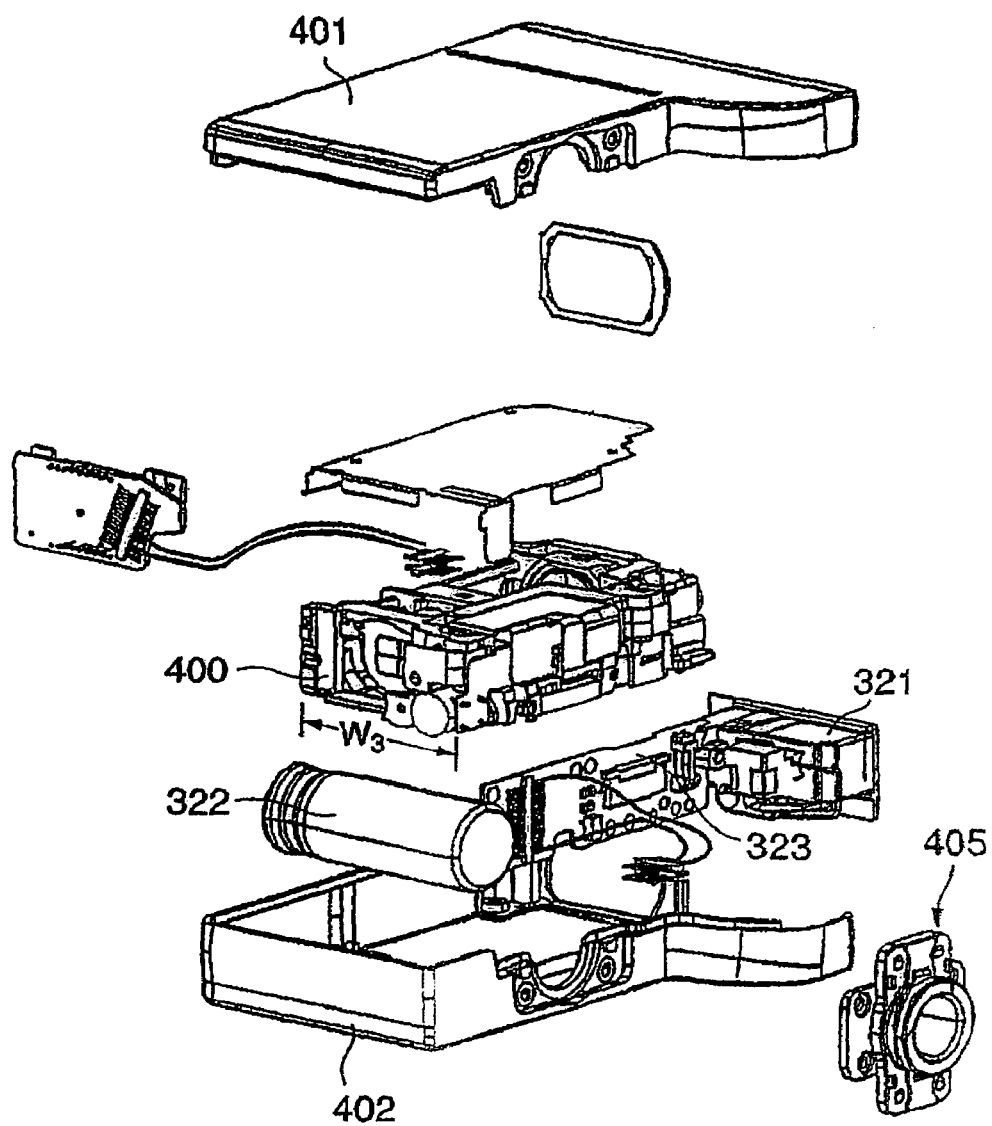
FIG. 11 is an exploded view of the imaging unit of an embodiment of the electronic camera according to the present invention.

Next, the composition of the imaging unit 101 will be explained. FIG. 10 is a perspective view of the imaging unit of an embodiment of the electronic camera according to the present invention with the upper cover thereof is removed, and FIG. 11 is an exploded view of the imaging unit of one embodiment of the electronic camera according to the present invention.

The imaging unit 101 of one embodiment of the electronic camera 100 as one embodiment of the invention is configured such that, as was explained with reference to FIG. 3, length $L_1$ from the lens 103 side end to the first protruded portion 115 side end corresponds for example to the length from the tip to near second joint of forefinger of the user and width $L_3$ of the root of the first protruded portion 115 corresponds to the thickness of the forefinger, the first protruded portion 115 protruding toward the operation unit 102 side being rounded.

The imaging unit 101 of the electronic camera 100 of an embodiment of the invention is composed such that the height of the lens frame of the lens group composing the zoom lens of the lens unit including the zooming mechanism is confined to about the same height of the sum of each thickness of the display 105 provided on the operation unit 102, memory slot 301 for inserting the memory card to memorize images, main board 300, and battery 302; a shutter which is generally formed into a circular profile is formed into a rectangular profile having the same height as that of the lens frame; and the peripheries of these lens frame and shutter are supporting faces of the housing composed of an upper cover 401 and a lower cover 402 of the imaging unit 101. The sum of the overall length of the optical axis of the zoom lens and the length of the space behind the zoom lens is confined to the length h of the rectangular battery 302 shown in FIG. 6(B) so that the width of the housing of the camera 100 does not largely exceed the sum of the battery length and the height of the buttons 106 and 107(see FIG. 1 to FIG. 3). Further, the length of the lens unit 400 is determined so that the unit 400 can be contained in the range of the width of the housing of the imaging unit 101 together with the electrical components such as the condenser 322, etc. behind the lens unit in order that the width of the rectangular shaped camera does not increase owing to the length of the lens unit 400. The driving mechanism of the zoom lens and the control board 323 of the flash unit 321 in the imaging unit 101 are located in the side space of the optical system, and electrical components such as the condenser 322 for the flash unit are located in the space opposite to the lens window 103 behind the lens unit 400.

By confining the sum of the overall length of the optical axis of the zoom lens and the length of the space behind the optical system to the length h of the battery 302 shown in FIG. 6(B) and locating the driving mechanism of the zoom lens beside the optical system, the overall length of the optical system does not change by switching on or off of the switch. Therefore, there is no need to pull out or draw back the lens unit every time the power switch is switched-on or -off as is the case with the conventional lens unit sinking type camera. Therefore, the camera as one embodiment of the invention is ready to shoot as soon as the control system is activated and the user can take photo opportunity without fail. In the case the number of lenses is increased to increase magnification, it is possible to utilize the space opposite to the lens window 103 behind the optical system to accommodate additional lenses to increase magnification, for an ample space is secured to accommodate electrical components such as the condenser 322, etc. for the flash unit and optical components.

In the electronic camera 100 of an embodiment of the invention, the battery 302 is located toward an end side of the operation unit 102 as is apparent in FIG. 6, the flash unit 321 in the imaging unit 101 is located near to the battery 302 side as is apparent in FIG. 5, and the longer side length of the housing of the camera is not largely longer than the sum of the width $W_1$(see FIG. 6(B)) of the battery 302, width $W_2$(see FIG. 5) of the flash unit 321, width $W_3$(see FIG. 11) of the lens unit 400 composed of the optical system and driving mechanism, and width necessary to locate operation buttons on the operation unit 101. As the longer side length of the electronic camera 100 is confined by the sum of width $W_1$~$W_3$, which are widths of the components absolutely necessary to compose a camera such as the battery 302 which is necessary to drive the electronic camera and must have a certain level of width $W_1$ with a low-profile battery, width $W_2$ of the flash unit 321 which is composed to be oblong in relation to horizontal to vertical ratio of the picture plane, width $W_3$ of the lens unit 400 indispensable to a camera, and width necessary to locate operation buttons on the operation unit 101, the longer side length of the rectangular shaped electronic camera 100 can be reduced to a minimum and small sized electronic camera can be provided.

In the electronic camera 100 of an embodiment of the invention, the flash unit 321 of the imaging unit 101 is protruded toward the operation unit 102 as the first protruded portion 115 such that the width $L_3$ Of the first protruded portion 115 is shorter than the width $L_4$ which is the difference between the shorter side width of the rectangular shaped camera and width $L_3$ of the first protruded portion 115, and the operation unit 102 has the second protruded portion 116 to correspond to the recessed portion of the imaging unit 101 formed as a result of the formation the first protruded portion 115. Therefore, a wide space is secured on the surface of the operation unit 102 rearward of the flash unit 321 of the imaging unit 101, and a relatively large display 105 can be provided on the operation unit 102 with the display 105 extending to the second protruded portion 116 of the operation unit 102. Further, as operation buttons 108~113 are located in the area relatively easy to touch, a user-friendly electronic camera easy to operate can be provided.

Figure 12:
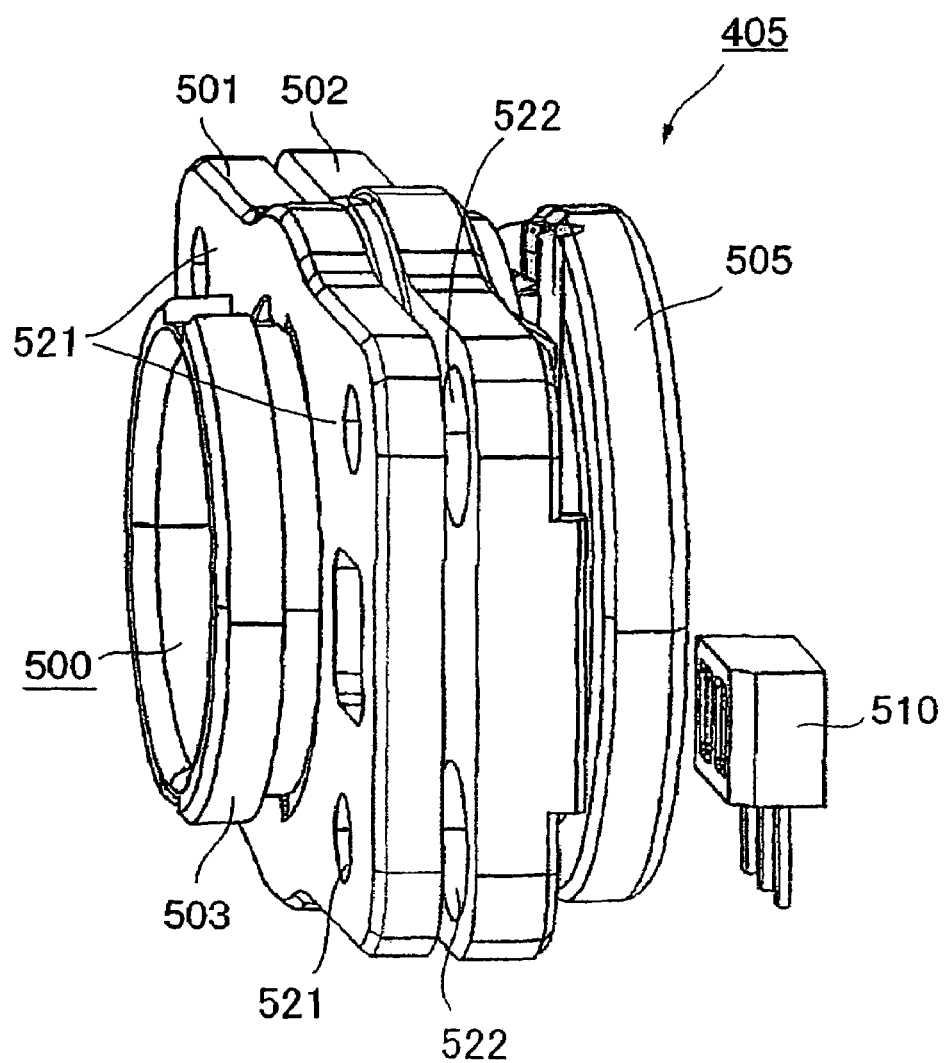
FIG. 12 is a perspective view showing the construction of the hinge mechanism for connecting the imaging unit 102 and operation unit 102 of the electric camera of an embodiment according to the present invention.
Figure 13:
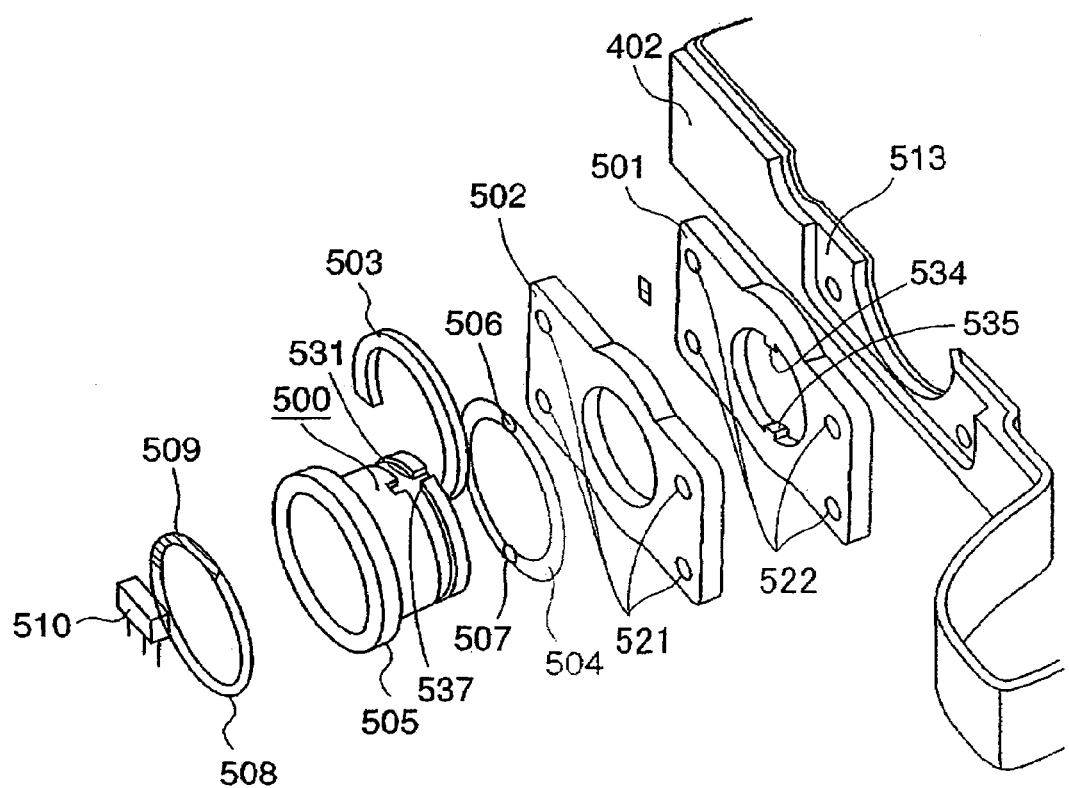
FIG. 13 is an exploded view of the hinge mechanism 405 shown in FIG. 12.
Figure 14:
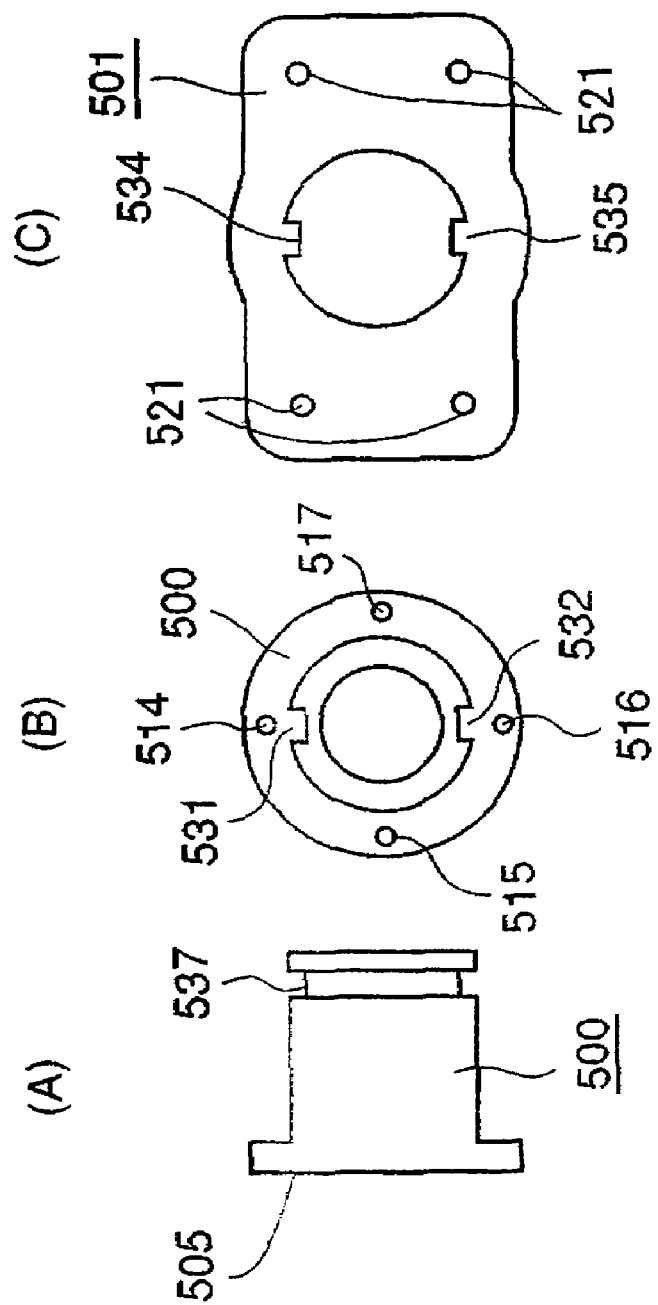
FIG. 14 is a drawing for explaining the mechanism to fix a hinge shaft 500 to a imaging unit side hinge plate 501.
Figure 15:
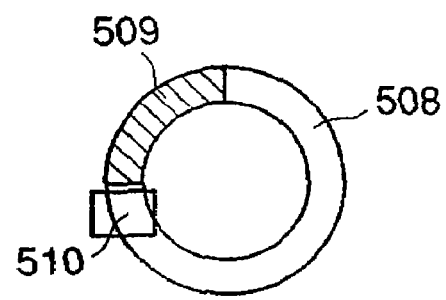
FIG. 15 is a plan view of a hinge marker 508.
Figure 16:
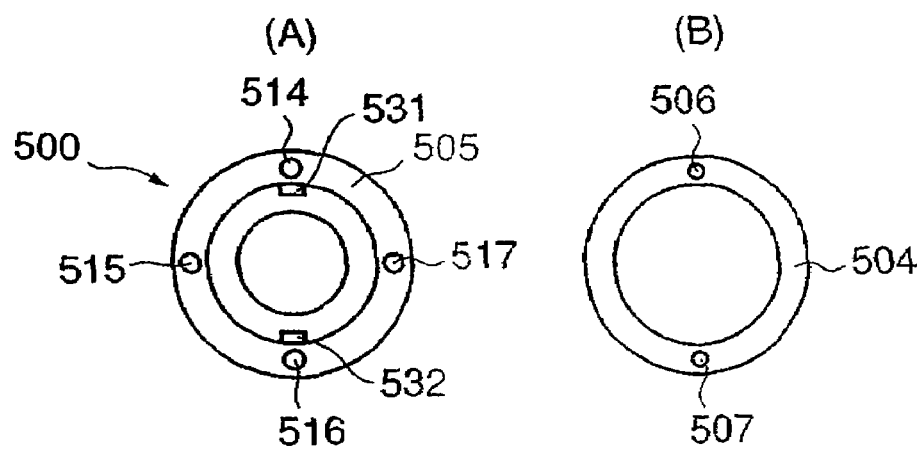
FIG. 16(A) is a drawing to show concave portions provided in the flange 505 of the hinge shaft 500.
FIG. 16(B) is a drawing to show protrusions provided on a circular spring 504.

The imaging unit 102 and operation unit 101 of the electronic camera of an embodiment of the invention are connected rotatably with a hinge mechanism 405 as shown in FIG. 8, FIG. 12 to 18. FIG. 8 is a perspective view showing the state the hinge mechanism 405 is attached to the imaging unit 101 and the upper cover and internal constituent parts are removed from the operation unit 102 to show the hinge portion. FIG. 12 is a perspective view showing the construction of the hinge mechanism for connecting the imaging unit 102 and operation unit 102 of the electric camera 100 of an embodiment of the present invention, FIG. 13 is an exploded view of the hinge mechanism 405 shown in FIG. 12, FIG. 14 is a drawing for explaining the mechanism to fix a hinge shaft 500 to a imaging unit side hinge plate 501, FIG. 15 is a plan view of a hinge marker 508.

Figure 17:
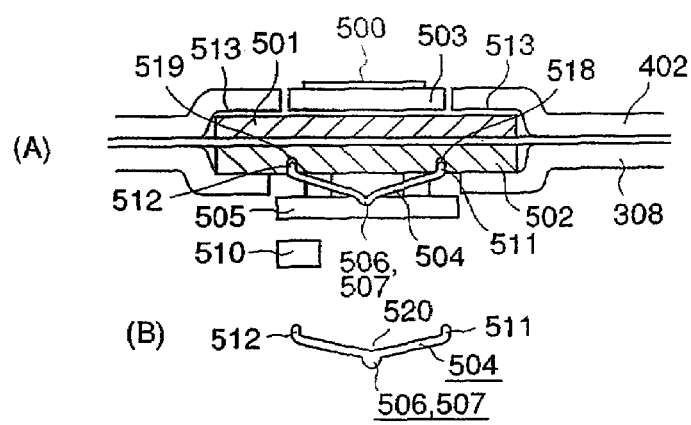
FIG. 17 is a partial sectional view of the hinging part when the hinge mechanism 405 is attached to the lower cover 402 of the imaging unit 101 and the lower cover 308 of the operation unit 102.
Figure 18:
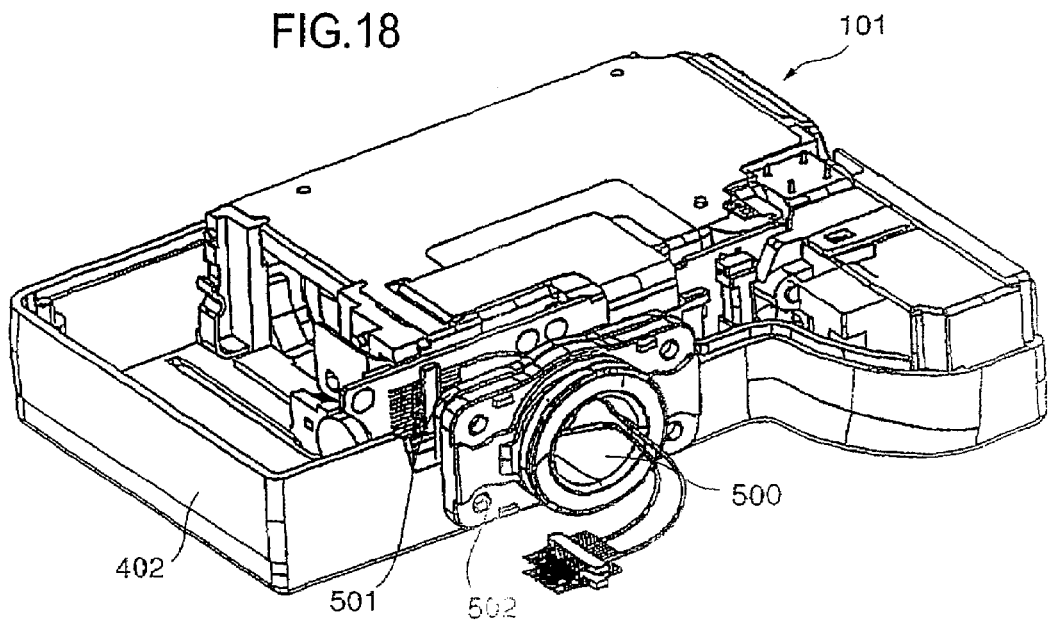
FIG. 18 is a drawing to show the state signal wires for connecting the imaging unit 101 and operation unit 102 are passed through the hollow of the hinge mechanism.

FIG. 16(A) is a drawing to show concave portions provided in the flange 505 of the hinge shaft 500, and FIG. 16(B) is a drawing to show protrusions provided on a circular spring 504. FIG. 17 is a partial sectional view of the hinging part when the hinge mechanism 405 is attached to the lower cover 402 of the imaging unit 101 and the lower cover 308 of the operation unit 102, and FIG. 18 is a drawing to show the state signal wires for connecting the imaging unit 101 and operation unit 102 are passed through the hollow of the hinge mechanism.

In the drawings, reference numeral 500 is a hinge shaft for turning the imaging unit 101 relative to the operation unit 102; 501 is a hinge plate of imaging unit side fixed to the side of imaging unit 101 and having protrusions to engage with key grooves of the hinge shaft 500 to stop the rotation of the hinge shaft 500; 502 is an operation unit side hinge plate fixed to the operation unit side 102 and serving as a bearing to allow the hinge shaft 500 to be rotated; 503 is a CE ring for pinching a circular spring 504, the body plate 502, and hinge plate 501 of the imaging unit side between the flange 505 of the hinge shaft 500, the circular spring 504 serving as an elastic member to give friction against the rotation of the hinge shaft and having two protrusions 506, 507 for setting the rotation position of the hinge shaft 500 and also having protrusions 511, 512 as shown in FIG. 17(A), (B) to attach the circular spring to the operation unit side hinge plate 502.

Reference numeral 508 is a hinge marker having a reflection pattern 509 on a part thereof as shown in FIG. 15 to be stuck on the flange 505 of the hinge shaft 500 for detecting the rotation angle of the imaging unit 101 relative to the operation unit 102 by means of a photoelectric device 510 integrating a light emitting device and a photo acceptance unit. Reference numeral 513 is a recess formed on the lower cover 402 of the imaging unit 101 for fixing the imaging unit side hinge plate 501, 514 to 517 are concaves formed on the flange 505 of the hinge shaft 500, 518 and 519 are holes for receiving the protrusions 511, 512 of the circular spring 504; 520 is a reinforcement portion formed on the back of each of the protrusions 506, 507 of the circular spring 504; 531 and 532 are key slot for preventing the hinge shaft 500 from rotating relative to the imaging unit side hinge plate 501; 534 and 535 are protrusions in the imaging unit side hinge plate 501 to engage with the key slots 531, 532 of the hinge shaft 500; and 537 is a groove to receive the CE ring 503.

The hinge shaft 500 of the hinge mechanism 405 has the flange 505 at one side and the groove 537 to receive the CE ring at the other side thereof as shown in FIG. 14(A). The key slots 531, 532 are profiled in the groove 537 side as is discerned in FIG. 14(B) which is a view from the groove 537 side, the key slot 531, 532 being for preventing the hinge shaft 500 from rotating relative to the imaging unit side hinge plate 501. On the other hand, protrusions 534, 535 are formed in the imaging unit side hinge plate 501 corresponding to the key slots 531, 532 of the hinge shaft 500. The hinge mechanism 405 is fixed to the lower cover 401 and upper cover 402 of the of the imaging unit 101 onto the recess 513 (see FIG. 13) with screws 522 passing through the holes 521 of the imaging unit side hinge plate 501 as shown in FIG. 8 and FIG. 17(A). The operation unit side hinge plate 502 is fixed in a like manner to the fixing recess not shown in the drawings of the upper cover 307 and lower cover 308 of the operation unit 102.

The hinge marker having the reflection pattern 509 at a part thereof is stuck on the flange 505 of the hinge shaft 500 as shown in FIG. 15, and the hinge shaft 500 is inserted through the circular spring 504 and operation unit side hinge plate 502 into the hole of the imaging unit side hinge plate 501 so that the key slots 531, 532 of the hinge shaft 500 engage with the protrusions 534, 535 of the imaging unit side hinge plate 501. Then the CE ring 503 is fitted in the groove 537 of the hinge shaft 500 to give friction against rotation of the hinge shaft by means of the circular spring 504 and to prevent dropping out of the hinge shaft. The photoelectric device 510 is fixed on the sub-board 303 at the position where the device 510 can detect the reflection pattern 509 on the hinge marker 508.

The protrusions 511, 512 of the circular spring 504 are received in the holes 518, 519 in the operation unit side hinge plate 502 as shown in FIG. 17(A) so that the circular spring 504 rotates together with the operation unit side hinge plate 502. The circular spring 504 has two protrusions 506, 507 as shown in FIG. 16(B) for setting the rotation position of the hinge shaft 500, and concaves 514~515 are provided with appropriate angular spacing on the imaging unit side sideface of the flange 505 of the hinge shaft 500 as shown in FIG. 6(A) so that the protrusions 506, 507 of the circular spring 504 can be received thereinto for position setting.

With the composition of the hinge mechanism like this, the imaging unit 101 can be rotated relative to the operation unit 102 with moderate friction caused by the circular spring 504. As the circular spring 504 is provided with protrusions 506, 507 which are engaged in the concaves 514~517 on the flange 505 of the hinge shaft 500 when the circular spring 504 is rotated by a determined angle, the rotation of the imaging unit 101 can be stopped and held at the rotation position, for example, of 90° or −90° relative to the operation unit 102. When the imaging unit 101 is turned to −90° position for self-portrait shooting for example as shown in FIG. 3, the photoelectric device 510 detects the reflection pattern 509 of the hinge marker 508 shown in FIG. 15 and sends a signal of detection to a controller not shown in the drawing of the electronic camera 100, whereby it is judged that the display 105 of the operation unit 102 and the lens window 103 of the imaging unit 101 are directed in the same direction. In this case, said controller not shown in the drawing controls to invert the picture, for if the picture is presented on the display the same way as is the case with normal shooting, the picture is displayed inversely. Therefore, shooting can be done without bothered by a feeling of strangeness irrespective of the rotation position of the imaging unit relative to the operation unit 102.

Cracks might develop in the back of the protrusion 506, 507 due to the pushing force from the flange 505 when the protrusions 506, 507 come off from the holes 514~517 on the flange 505 of the hinge shaft 500. To prevent this, the circular spring 504 of an embodiment of the present invention has the reinforcement portion 520 on the back of each of the protrusions 506 and 507 as shown in FIG. 17(B). The reinforcement portion 520 may be formed by forging press or MIM (Metal Injection Molding) or die casting, etc. By the reinforcement like this, troubles can be prevented that position setting of the imaging unit 101 becomes impossible and friction force is reduced due to the cracks developed at the back of the protrusions 506, 507.

As the hinge shaft 500 is formed into a hollow shaft as is apparent in FIG. 8 and FIG. 12 to FIG. 18, signal wires for connecting the imaging unit 101 and operation unit 102 can be passed through the hollow, and mechanical contact points are not needed for electric wire connection of the units.

In the foregoing explanation, although it was explained that the rotation of a determined angle of the imaging unit relative to the operation unit is detected by the use of the pattern 509 stuck on the hinge marker 508, it is suitable to constitute so that not only the rotation of the determined angle is detected but the fact that there was a relative rotation is detected or the angle of relative rotation is detected by using an encorder for example. It is also suitable to constitute so that the power source is switched on by a relative rotation between the imaging unit 101 and operation unit 102 by providing a mechanical device and switch.

Figure 19:
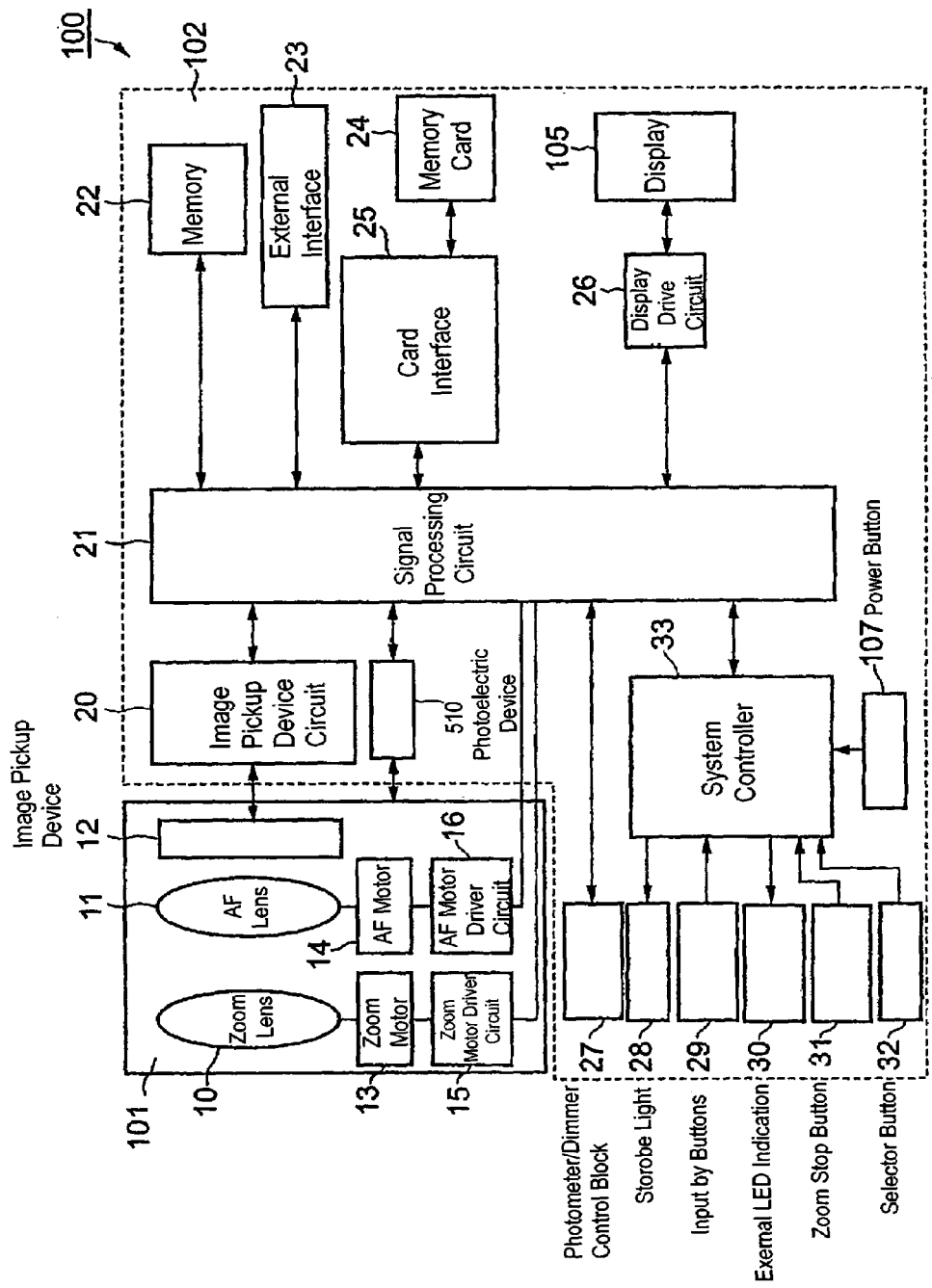
FIG. 19 is a block diagram of the control circuit of an embodiment of the electronic camera according to the present invention.
Figure 20:
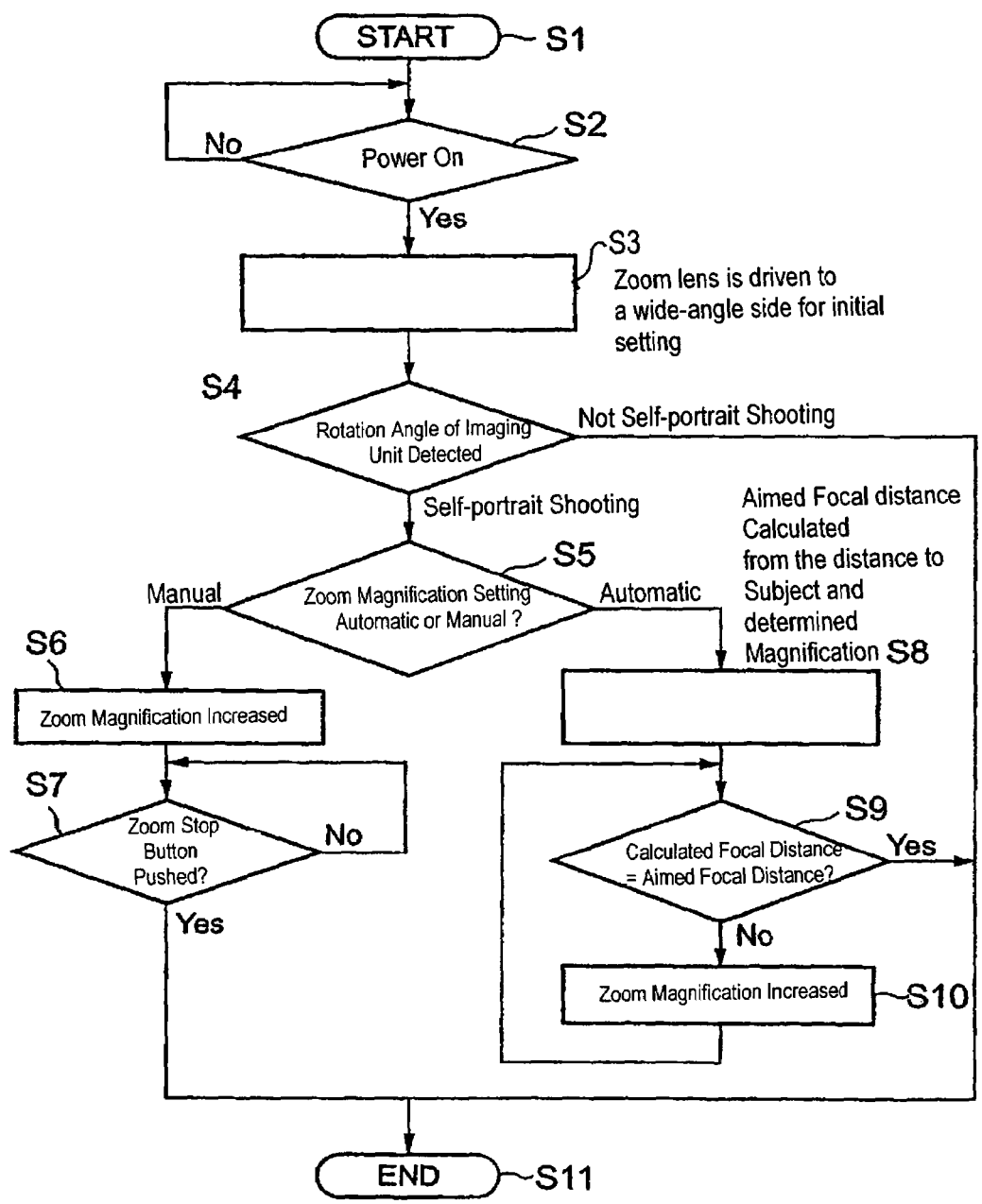
FIG. 20 is a flow diagram when shooting a self-portrait of an embodiment of the electronic camera according to the present invention.
Figure 21:
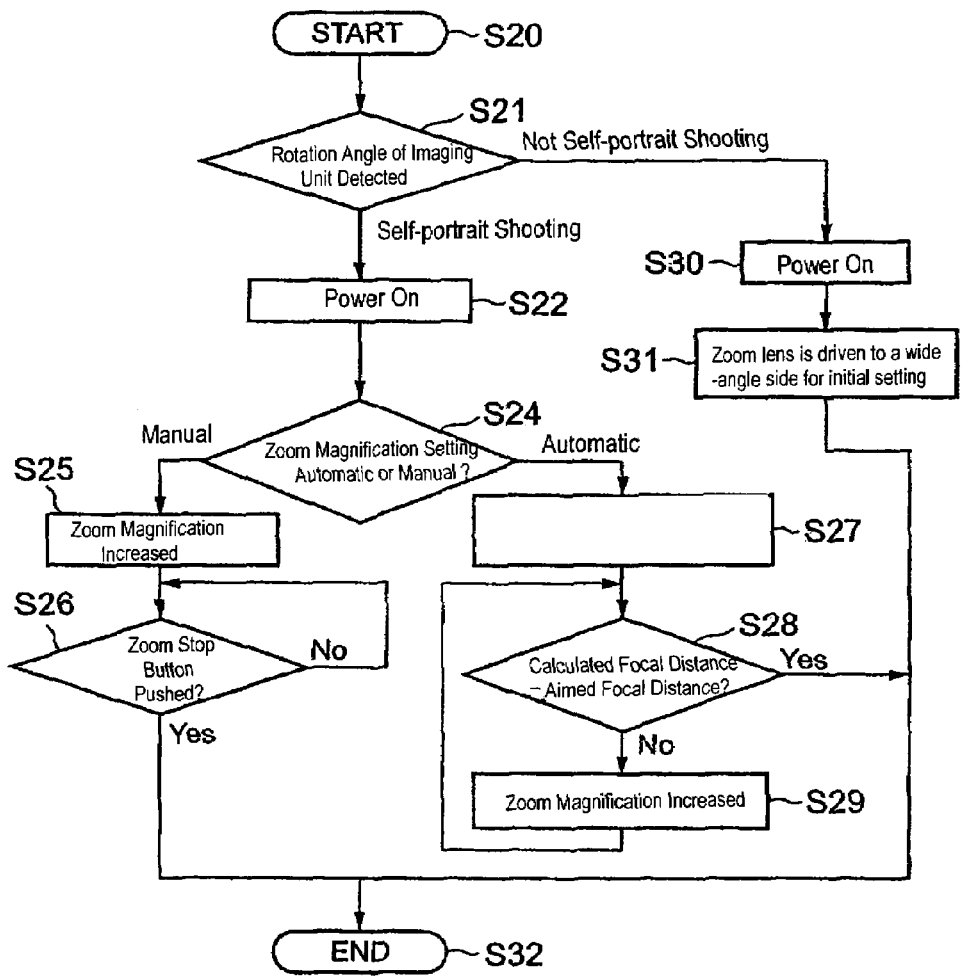
FIG. 21 is a flow diagram of a second embodiment of the electronic camera according to the present invention.
Figure 22:
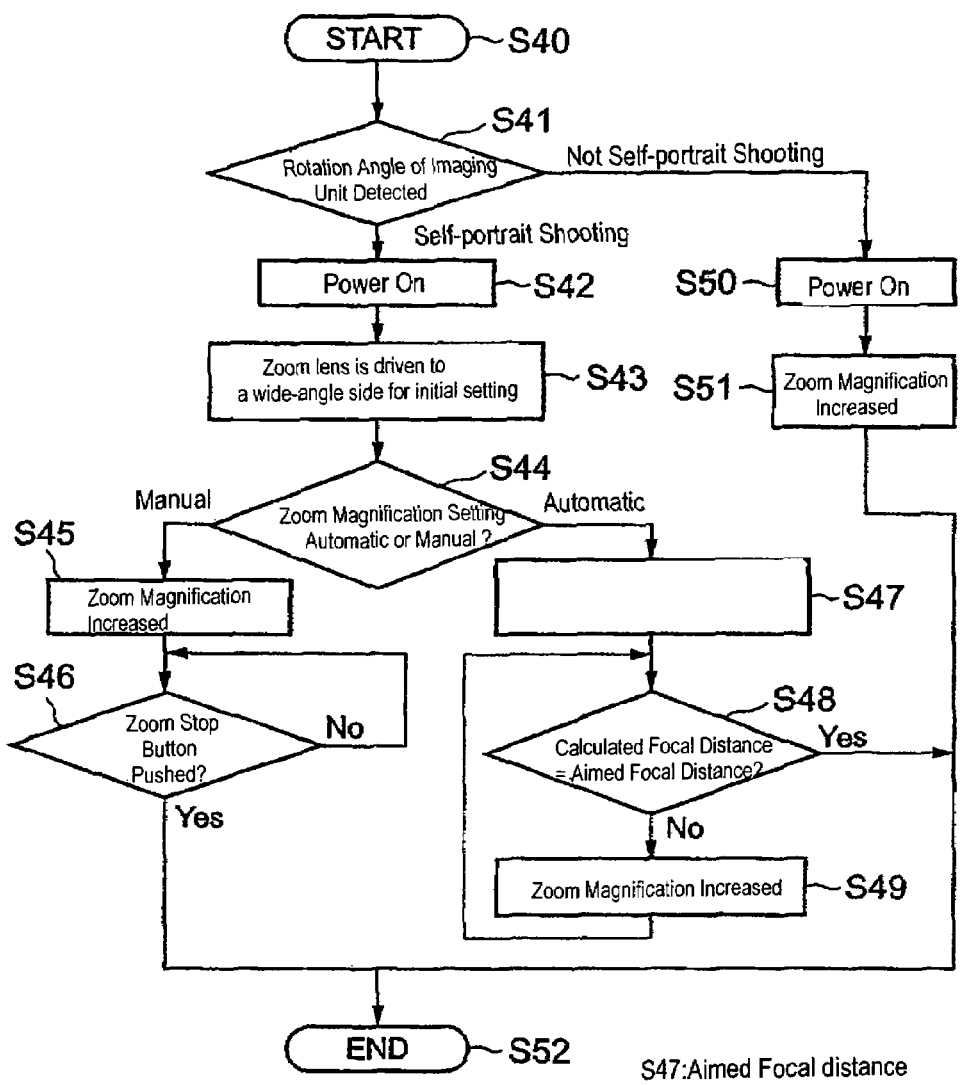
FIG. 22 is a flow diagram of a third embodiment of the electronic camera according to the present invention.

Next, the control circuit of the electronic camera of an embodiment of the present invention will be explained referring to FIG. 19 to FIG. 22. FIG. 19 is a block diagram of the control circuit of an embodiment of the electronic camera according to the present invention, FIG. 20 is a flow diagram when shooting a self-portrait of an embodiment of the electronic camera according to the present invention, FIG. 21 is a flow diagram of a second embodiment of the electronic camera according to the present invention, and FIG. 22 is a flow diagram of a third embodiment of the electronic camera according to the present invention.

Referring to FIG. 19, reference numeral 10 is a zoom lens for changing focal distance of the optical system of the electronic camera, 11 is an auto-focusing lens included in the optical system, 12 is an image pickup device such as a CCD, 13 is a zoom motor to drive a cam mechanism, etc. for moving lens for zooming, 14 is an AF(auto-focus) motor for moving the auto-focusing lens, 15 is a drive circuit for driving the zoom motor, 16 is an AF motor drive circuit for driving the AF motor, and 20 is a drive circuit of the image pickup device 12. Reference numeral 21 is a signal processing circuit, and 22 is a memory storing a variety of control information such as for example the size of the self-portrait on the display 105 when shooting a self-portrait, i.e. a determined zoom magnification. Reference numeral 23 is an external interface such as USB, 24 is an external memory such as a memory card for storing pictured images, 25 is an interface for the memory card 24, 26 is a drive circuit of the display 105, 27 is a photometer/dimmer control block for measuring the light intensity and color temperature of the subject to be shot, and 28 is a strobe light emitting device and its drive circuit as a flash unit. Reference numeral 29 indicates operation of buttons(inputting) to send input signals by operating a variety of buttons such as the shutter release button 106, selection & setting button 108, zoom button 109, menu button 110, display button 111, scene button 112, mode selection button 113, etc. Reference numeral 30 is the drive circuit of an external LED indication device for making known to outside the state of power switch on, etc. Reference numeral 31 is a zooming stop button for compulsorily stopping zooming if zooming is done when shooting a self-portrait, 32 is a selector button for selecting whether zooming is to be stopped automatically at a determined magnification or to be stopped compulsorily by hand operation when shooting a self-portrait, and 33 is a system controller.

When using the electronic camera 100, first the power button 107 is pushed, by which a signal is sent to the system controller 33 shown in FIG. 19 to allow the power source to be switched on. Then, by operating the operating buttons by the thumb as mentioned before, each signal corresponding to each of the buttons is sent from the inputting 29 in FIG. 19 to the system controller 33, and the system controller 33 executes the command indicated by each signal. When the aperture priority mode, shutter priority mode, sport mode to shoot a subject moving with high speed, macro mode to shoot a subject in a short range, strobe control mode for forced strobe lighting or shutdown of lighting, moving picture photographing mode, or playback mode is selected by the mode selection button 113, the camera operates in accordance with the selected mode. The menu button 110 is pushed as necessary to allow menus such as the size of picture, sensitivity, photometry to be displayed, then desired item can be selected by the 4-way button of the selection & setting button 108 composed of the 4-way button and setting button, and the selection is determined by pushing the central button of the selection & setting button 108. The result of selection is sent to the system controller 33 to be executed.

As explained referring to FIG. 2, to take a photo with the electronic camera, the lens window 103 is directed toward the subject to be shot, the zoom button 109 of the operation unit 102 is operated with the thumb of right hand while viewing the picture presented on the display 105 to determine picture composition, then the shutter release button 106 is pushed by the forefinger of right hand. The signals from the buttons are sent to the zoom motor drive circuit 15 and AF motor drive circuit 16 by way of the system controller 33 and signal processing circuit 21, the zoom motor 13 and AF motor 14 are driven to zoom to a magnification selected by the zoom button and focus automatically, exposure is determined according to the signal from the photometer/dimmer control block 27, and the image photographed by the image pickup device 12 such as an integrated CCD, etc. is sent to the memory card 24 via the image pickup device drive circuit 20, signal processing circuit 21, and card interface 25 to be stored therein.

When shooting is over and the mode selection button 113 is operated to the play back mode, its signal is sent to the memory card interface 25 and display drive circuit 26 by way of the system controller 33 and signal processing circuit 21, a memorized images are presented on the display 105, the images being able to be sequentially shifted by operating the 4-way button of the selection & setting button 108. When the moving picture mode is selected, motion picture is stored in the memory in the same way and a desired scene can be selected by the scene button 112 to be displayed and the recorded sound can also be played back by the speaker 114.

Next, the operation when shooting a self-portrait will be explained referring to the block diagram of FIG. 6 and the flow diagram of FIG. 20. In the electronic camera 100 of an embodiment of the invention, when the power button 107 shown in FIG. 19 is switched on at the step S2 in FIG. 20, the signal is sent to the system controller 33 as mentioned above, and at step S3 the system controller 33 sends a signal to the zoom motor drive circuit 15 via the signal processing circuit 21 to drive the zoom motor 13 to perform initial setting of the zoom lens 10 to a wide-angle side. At this time, if deviation has occurred in the zoom lens due to vibration for example, etc. in the lens system, the zoom lens can be reset. At the succeeding step S4, the system controller 33 judges whether the imaging unit 101 is turned to the position of self-portrait shooting by receiving the signal detected by the photoelectric device 510 via the signal processing circuit 21. As the hinge marker 508 having the reflection pattern 509 is stuck on the hinge shaft 500, the rotation position of the imaging unit 101 relative to the operation unit 102 is detected and when the rotation position is +90°, that is, when the lens window 103 of the imaging unit 101 is not directing to the same direction as that of the display of the operation unit 102, the system controller 33 judges that self-portrait shooting is not intended and the flow in FIG. 20 is jumped to step S11, and when the rotation position is −90°, that is, when the lens window 103 of the imaging unit 101 is directing to the same direction to that of the display 105 of the operation unit 102, the system controller 33 judges that self-portrait shooting is intended and allow to proceed to step S5.

At step S5, the system controller 33 judges according to the signal from the selector button 32 for selecting whether zooming is to be stopped automatically at a determined magnification or to be stopped by hand operation when shooting a self-portrait, and when hand operation is selected the flow proceeds to S6 and when automatic operation is selected the flow proceeds to S8. When the flow proceeded to S6, a signal is sent to the zoom motor drive circuit 15 via the signal processing circuit 21 to drive the zoom motor 13 to increase zoom magnification. Then at next step S7, whether the zoom stop button 31 is pushed or not is monitored, when not pushed the flow is returned and when pushed the signal is sent to the zoom motor drive circuit 15 via the signal processing circuit 21 and the driving of the zoom motor 13 is stopped. By this, the zoom lens 10 stops at a desired magnification.

In this case, when the state that the zoom stop button 31 is not pushed continues, the zoom lens 10 is driven this time toward the wide-angle side for example after it is driven to the end of telescopic side, and when it is driven to the end of the wide-angle side it is driven this time toward telescopic side. It is possible to stop the drive of the zoom lens 10 at the wide-angle side or telescopic side after repetition of this or to shift to the automatic magnification setting mode as explained below.

When proceeded from step S5 to step S8, that is, when proceeded to the mode of automatic setting of zoom magnification, the system controller 33 receives at step S8 the result of drive of the AF motor 14 from the AF motor drive circuit 16 via the signal processing circuit 21 and calculates the distance L between the electronic camera 100 and the subject to be shot. Then the system controller 33 reads out magnification Z predetermined and memorized in the memory 22 for self-portrait shooting and calculates an aimed focal distance of the zoom lens based on the distance L to the subject and predetermined magnification Z. Relation between focal distance f, L, and Z is presented by following formula(1).

$$Z=f/L \quad (1)$$

At next step S9, the system controller 33 receives the result of drive of the zoom motor 13 from the zoom motor drive circuit 15 via the signal processing circuit 21 and judges whether the focal distance of the zoom lens coincides with the aimed focal distance F. When it is judged that they coincide, the flow proceeds to step S11 to be ended. When it is judged that they do not coincide, a direction is given at step S10 to the zoom motor drive circuit 15 by way of the signal processing circuit 21 to increase zoom magnification of the zoom lens 10. The cycle of step 9 and step 10 are repeated until the focal distance of the zoom lens 10 coincides with the aimed focal distance F. When they coincides, a direction is given to the zoom motor drive circuit 15 to stop the zoom motor 13 to stop the increasing of magnification and the flow proceeds to step S11 to be ended.

When the imaging unit 101 is directed in the same direction as that of the display 105 of the operation unit 102 for shooting a self-portrait and this is detected at step S4, the system controller 33 directs the signal processing circuit 21 to display the image inversely, and the signal processing circuit 21 inverts the image sent from the image pickup device 12 upside down and sends inverted image by way of the display drive circuit 26 to the display 105, for if the image taken by the image pickup device 12 is displayed as is the case with normal shooting, the picture is presented on the display 105 upside down. Therefore, shooting can be done without bothered by a feeling of strangeness irrespective of the rotation position of the imaging unit 101 relative to the operation unit 102. Although the photoelectric device 510 is used to detect the rotation angle of the imaging unit 101, it is of course possible to use mechanical methods for the detection. In the foregoing explanation, although zoom magnification is increased in step S10 in the case of self-portrait shooting, it is suitable to control similarly in the case of other than self-portrait shooting, and it is also suitable to decrease and then increase zoom magnification in both cases.

Next, the operation flow of a second embodiment of the electronic camera as one embodiment of the invention will be explained referring to FIG. 21. In the foregoing explanation, whether the power is switched on or not is detected at step 2, and then the rotation angle of the imaging unit is detected to judge whether it is intended to shoot a self-portrait or not. In the flow diagram of the second embodiment shown in FIG. 21, an operation flow when intention of self-portrait shooting is apparent before turning on the power is shown. In this case, when the imaging unit 101 is rotated to prepare for self-portrait shooting before the power is turned on, the power is automatically turned on, and when the imaging unit is rotated after the power is turned on, the user can turn on the power. When composing so that the power is turned on when the imaging unit 101 is turned, it is suitable to compose such that a mechanism with a switch as mentioned before is provided to allow the power to be turned on by the rotation of the imaging unit 101 relative to the operation unit 102. When the imaging unit 101 is rotated at step 21, the system controller 33 receives a signal detected by the photoelectric device 510, which detects the reflection pattern 509 of the hinge marker 508 stuck on the hinge shaft 500, by way of the signal processing circuit 21 and judges whether the rotation of the imaging unit 101 in the direction for self-portrait shooting or not. The flow proceeds to step S22 when it is in the direction for self-portrait shooting, to step S30 when not in the direction for self-portrait shooting whereby the power is automatically turned on. When not shooting a self-portrait, the system controller 33 sends at step S31 a signal to the zoom motor drive circuit 15 via the signal processing circuit 21 to drive the zoom motor to the wide-angle side to perform initial setting of the zoom lens 10, and the flow ends.

On the other hand, when shooting a self-portrait, the system controller 33 judges at step 24 the signal from the selector button 32 for selecting whether zooming is to be stopped automatically at a determined magnification or to be stopped by hand operation when shooting a self-portrait, when hand operation is selected, the flow proceeds to step S25, and when automatic operation is selected, the flow proceeds to step S27. When proceeded to step S25, the system controller 33 sends a signal to the zoom motor drive circuit 15 via the signal processing circuit 21 to drive the zoom motor 13 to increase zoom magnification. At next step S26, whether the zoom stop button 31 is pushed or not is monitored, when not pushed the flow is returned and when pushed the signal is sent to the zoom motor drive circuit 15 via the signal processing circuit 21 and the driving of the zoom motor 13 is stopped. Accordingly, the zoom lens 10 stops at a desired magnification.

In this case, when the state that the zoom stop button 31 is not pushed continues, the zoom lens 10 is driven toward the wide-angle side for example after it is driven to the end of telescopic side, and when it is driven to the end of the wide-angle side it is driven this time toward telescopic side. It is possible to stop the drive of the zoom lens 10 at the wide-angle side or telescopic side after repetition of this or to shift to the automatic magnification setting mode as explained below.

When proceeded from step S24 to step S27, that is, when proceeded to the mode of automatic setting of zoom magnification, the system controller 33 receives at step S27 the result of drive of the AF motor 14 from the AF motor drive circuit 16 via the signal processing circuit 21 and calculates the distance L between the electronic camera 100 and the subject to be shot. Then the system controller 33 reads out magnification Z predetermined and memorized in the memory 22 for self-portrait shooting and calculates an aimed focal distance of the zoom lens based on the distance L to the subject and predetermined magnification Z from the equation (1).

At next step S28, the system controller 33 receives the result of drive of the zoom motor 13 from the zoom motor drive circuit 15 via the signal processing circuit 21 and judges whether the focal distance of the zoom lens coincides with the aimed focal distance F. When it is judged that they coincide, the flow proceeds to step S29 to be ended. When it is judged that they do not coincide, a direction is given at step S29 to the zoom motor drive circuit 15 byway of the signal processing circuit 21 to increase zoom magnification of the zoom lens 10. The cycle of step 28 and step 29 are repeated until the focal distance of the zoom lens 10 coincides with the aimed focal distance F. When they coincides, a direction is given to the zoom motor drive circuit 15 to stop the zoom motor 13 to stop increasing of magnification and the flow proceeds to step S11 to be ended.

When the imaging unit 101 is directed in the same direction as that of the display 105 of the operation unit 102 for shooting a self-portrait and this is detected at step S21, the system controller 33 directs the signal processing circuit 21 to display the image inversely, and the signal processing circuit 21 inverts the image sent from the image pickup device 12 upside down and sends inverted image byway of the display drive circuit 26 to the display 105, for if the image taken by the image pickup device 12 is displayed as is the case with normal shooting, the picture is presented on the display 105 upside down, as mentioned before.

Next, the operation flow of a third embodiment of the electronic camera as one embodiment of the invention will be explained referring to FIG. 22. With the third embodiment, the power is turned on automatically when the imaging unit 101 is rotated to prepare for self-portrait shooting before the power is turned on, and the user turns on the power when the imaging unit is rotated after the power is turned on as is the case with the second embodiment. When the imaging unit 101 is rotated at step 41, the system controller 33 receives a signal detected by the photoelectric device 510, which detects the reflection pattern 509 of the hinge marker 508 stuck on the hinge shaft 500, by way of the signal processing circuit 21 and judges whether the rotation of the imaging unit 101 in the direction for self-portrait shooting or not. The flow proceeds to step S42 when it is in the direction for self-portrait shooting, to step S50 when not in the direction for self-portrait shooting whereby the power is automatically turned on. When not shooting a self-portrait, the system controller 33 sends at step S51 a signal to the zoom motor drive circuit 15 via the signal processing circuit 21 to drive the zoom motor to increase zoom magnification.

On the other hand, when shooting a self-portrait, the system controller 33 performs at step S43 the initial setting of the zoom lens to the wide-angle side and judges at step 44 the signal from the selector button 32 for selecting whether zooming is to be stopped automatically at a determined magnification or to be stopped by hand operation when shooting a self-portrait, when hand operation is selected, the flow proceeds to step S45, and when automatic operation is selected, the flow proceeds to step S47. When proceeded to step S45, the system controller 33 sends a signal to the zoom motor drive circuit 15 via the signal processing circuit 21 to drive the zoom motor 13 to increase zoom magnification. At next step S46, whether the zoom stop button 31 is pushed or not is monitored, when not pushed the flow is returned and when pushed the signal is sent to the zoom motor drive circuit 15 via the signal processing circuit 21 and the driving of the zoom motor 13 is stopped. Accordingly, the zoom lens 10 stops at a desired magnification.

In this case, when the state that the zoom stop button 31 is not pushed continues, the zoom lens 10 is driven toward the wide-angle side for example after it is driven to the end of telescopic side, and when it is driven to the end of wide-angle side it is driven this time toward telescopic side. It is possible to stop the drive of the zoom lens 10 at the wide-angle side or telescopic side after repetition of this or to shift to the automatic magnification setting mode as explained below.

When proceeded from step S44 to step S47, that is, when proceeded to the mode of automatic setting of zoom magnification, the system controller 33 receives at step S47 the result of drive of the AF motor 14 from the AF motor drive circuit 16 via the signal processing circuit 21 and calculates the distance L between the electronic camera 100 and the subject to be shot. Then the system controller 33 reads out magnification Z predetermined and memorized in the memory 22 for self-portrait shooting and calculates an aimed focal distance of the zoom lens based on the distance L to the subject and predetermined magnification Z from the equation (1).

At next step S48, the system controller 33 receives the result of drive of the zoom motor 13 from the zoom motor drive circuit 15 via the signal processing circuit 21 and judges whether the focal distance of the zoom lens coincides with the aimed focal distance F. When it is judged that they coincide, the flow proceeds to step S52 to be ended. When it is judged that they do not coincide, a direction is given at step S49 to the zoom motor drive circuit 15 by way of the signal processing circuit 21 to increase zoom magnification of the zoom lens 10. The cycle of step 48 and step 49 are repeated until the focal distance of the zoom lens 10 coincides with the aimed focal distance F. When they coincides, a direction is given to the zoom motor drive circuit 15 to stop the zoom motor 13 to stop increasing of magnification and the flow proceeds to step S11 to be ended.

When the imaging unit 101 is directed in the same direction as that of the display 105 of the operation unit 102 for shooting a self-portrait and this is detected at step S41, the system controller 33 directs the signal processing circuit 21 to display the image inversely, and the signal processing circuit 21 inverts the image sent from the image pickup device 12 upside down and sends inverted image by way of the display drive circuit 26 to the display 105, for if the image taken by the image pickup device 12 is displayed as is the case with normal shooting, the picture is presented on the display 105 upside down, as mentioned before.

In the foregoing explanation, although the controlling of setting the zoom lens toward the wide-angle side is divided in the case of self-portrait shooting and in the case of other than self-portrait shooting and the controlling of increasing zoom magnification is also divided similarly, it is suitable to control the zoom lens toward the wide-angle side or telescopic side and to control the zoom lens to increase or decrease in magnification.

As has been mentioned in the foregoing, the housing of the operation unit 102 of the electronic camera 100 is composed of an upper and lower cover 307 and 308, the main board 300 which is provided with the memory slot 301 on one of its surface and a space to place the battery 302 on the other surface is supported by the main board supporting parts provided at a corner or a plurality of corners inside the covers 307 and 308, the display 105 is located on the memory slot 301 side of the main board 300, and the sub-board 303 to control the imaging unit 101 is located sideward of the space to place the battery 302, so the operation unit 102 can be configured to have a thickness of the sum of the thickness of the display 105 and of the main board provided with the memory slot 301 and space to place the battery 302 on both surfaces thereof. Therefore, a low-profile electronic camera having a thickness with which the camera can be slipped into the breast pocket of one's shirt or back pocket of one's pants can be provided.

The support pillar 309 and/or 310 is provided to one of the cover 307 or 308 or to both of the covers composing the housing of the operation unit 102 to pass through the holes provided near the center of the main board to hold the main board 300 in place loosely to accommodate to a case distortion is caused in the housing, so even in case the electronic camera 100 is dropped through carelessness for example and the housing is temporarily deformed, the main board 300 is not deformed. Therefore, such a trouble that the CPU, etc. mounted on the main board is removed off from the board can be prevented.

Either of the upper and lower cover of the housing of the operation unit 102 is provided with the rib 312 extending in the direction of the optical axis in the imaging unit 101 in the state both units are positioned in parallel with each other and the other cover is provided with the rib 313 extending in the direction perpendicular to the optical axis, and the main board 300 is pinched loosely by the ribs 312 and 313, so even in case the electronic camera 100 is dropped through carelessness for example and the housing is temporarily deformed, the main board 300 is not deformed. Therefore, such a trouble that the CPU, etc. mounted on the main board is removed off from the board can be prevented.

The opening for providing the display 105 is formed in the upper cover 307 of the operation unit 102 toward the imaging unit 101 connected adjacent to the operation unit 102, and operation buttons are located on the cover in the front side of the opening, so that the operation buttons can be touched with the thumb of right hand without the display 105 being interfered with the right hand when the operation unit 102 is held for example by the right hand.

The operation buttons located on the operation unit 102 are composed such that they do not protrude from the flat surface of the upper cover, so that an electronic camera which can be slipped into the breast pocket of one's shirt or back pocket of one's pants without interfering with the edge of the pocket when accommodating the camera in the pocket can be provided.

The width of the camera is confined in accordance with the height of the battery 302 necessary for driving the electronic camera and the length of the optical system in the imaging unit 101, that is, the width of the camera is not wider than the sum of the heights of the battery and the buttons located in front of the battery and further the length of the optical system in the imaging unit 101 is determined such that a space can be secured behind the optical system for locating electrical components so that the width of the camera does not increase owing to the length of optical system. Therefore, the width of the camera is confined to be narrower than a certain value and the low-profile electronic camera 100 can be provided. Further, as the lens drive mechanism is located in the sideward space of the imaging unit 101, the lens of small diameter can be used not as the case with the prior art in which the diameter of zoom lens must be increased due to the cylindrical cam necessary to drive the zoom lens. Therefore, a low-profile electronic camera 100 can be provided. Further, by locating the imaging unit side control board 323 sideward adjacent to the lens drive mechanism and locating at least an electrical component 322 for the flash unit in the space behind the optical system, the inside space of the imaging unit 101 is effectively utilized and when, for example, a wider magnification of zooming is required, it can be easily realized with the electronic camera 100 which can be accommodated in the breast pocket of one's shirt or back pocket of one's pants without bothered by a feeling of strangeness.

The battery 302 is located in an end side of the operation unit 102, the flash unit 321 in the imaging unit 101 is located near to the battery 302, the length of the camera is defined by the sum of the widths of the battery 302, flash unit 321, and optical system 400, that is, the camera is configured such that its length does not largely exceed the sum of the widths of the battery 302, flash unit 321, optical system 400, and an additional width of operation buttons as necessary, so that the length of the electronic camera 100 is confined by the sum of the widths of the components absolutely necessary to compose a camera such as the battery 302 which is necessary to drive the electronic camera and must have a certain level of width when composed as a low-profile battery, width of the flash unit 321 which is composed to be oblong in relation to horizontal to vertical ratio of the picture plane, width of the lens system indispensable to a camera, and width necessary to locate operation buttons on the operation unit 102. Therefore, the length(longer side length of the rectangular shaped electronic camera 100) can be reduced to a minimum and small sized electronic camera can be provided.

The electronic camera 100 of an embodiment of the invention has the first protruded portion 115 of the imaging unit 101, the first protruded portion 115 being protruded toward the operation unit 102 and the flash unit 321 being located therein, and the second protruded portion 116 of the operation portion 102, the second protruded portion 116 being protruded toward the imaging unit 101 to correspond to the recessed portion of the imaging unit 101 formed due to the formation of the first protruded portion 115, so that a wide space is secured on the operation unit 102 to allow a relatively large display 105 to be disposed extending toward the second protruded portion 116 of the operation unit 102 and operation buttons 108~113 can be located in the area relatively easy to touch for operation. Therefore, the electronic camera 100 easy to operate can be provided.

Further, as the electronic camera 100 of an embodiment of the invention is composed such that the lens window 103 side(front side) portion of the imaging unit 101 is protruded toward the operation unit 102 side to provide the flash unit 104 in said portion, the width of the camera can be reduced, and as the distance to the rotation center of the hinge mechanism from the lens window 103 side (front side) is wider than that from the rear side, the rotation radius of the lens window side is relatively large, and a relatively large distance is secured between the display and lens window when both the display and lens window are directed in the same direction, that is, when shooting a self-portrait. Therefore, an electronic camera of good usability can be provided.

By forming the first protruded portion 115 of the image pickup portion 101 such that the width thereof is about the thickness of the forefinger and length from the lens window side to the end thereof is about the length from the tip to near the second joint of the forefinger, the imaging unit 101 can be turned by pinching the first protruded portion 115 with the forefinger and middle finger to direct the lens window to a subject to be shot with the operation unit 102 of the camera held firmly by the right hand. Therefore, an electronic camera of good usability can be provided.

By determining the distance from the lens window 103 of the imaging unit 101 to the rotation center of the hinge mechanism so that the viewing field on the display is not constricted by the presence of the first protruded portion 115 in front of the display 105 when the lens window 103 of the imaging unit 101 is turned to the display 105 side of the operation unit 102, the user can shoot a self-portrait while viewing self image on the display. Therefore, an electronic camera with which self-portrait shooting is easily done can be provided.

By protruding the front side(lens window side) of the imaging unit 101 and locating the flash unit in the protruded portion, the protruded portion 115 can be formed in a small width, the operation unit 102 can be extended behind the protruded portion of the imaging unit 101, and the display 105 can be disposed to extend toward the imaging unit 101 leaving a space in the end side of the operation unit 102 so that operation buttons such as the selection & setting button and menu button can be located in said space. So, the user can touch operation buttons while viewing the display 105. Therefore, electronic camera with which self-portrait shooting is easily done can be provided.

Further, according to an embodiment of the invention, by composing the electronic camera such that the rotation of the imaging unit is detected by the pattern for detecting the rotation angle provided on the flange of the hinge shaft of the hinge mechanism and the photoelectric device which is simple and inexpensive, the rotation angle can be easily detected, and as the photoelectric device can be located at some distance from the hinge shaft, mechanical junction and wiring are not required resulting in easy assembling, and a breakage in the wiring cable can be eliminated. Further, as there is no need to provide a switch to the hinge mechanism, it is possible to downsize the hinge mechanism and a compact electronic camera can be provided.

By composing the hinge mechanism such that concaves are formed on the flange of the hinge shaft of the hinge mechanism at a certain spacing, protrusions are formed on the circular spring, and the imaging unit is held in determined positions by the engagement of said protrusions with said concaves on the flange of the hinge shaft, the imaging unit can be held at determined rotation angles relative to the operation unit, thus an electronic camera easy to handle can be provided.

By forming the reinforcement portion on the back side of the protrusions of the circular spring, development of cracks in the back faces of the protrusions, which might occur due to the pressing force between the imaging unit and operation unit when the protrusions come out of the concaves due to the rotation of the imaging unit, can be prevented.

Further, by forming the hinge shaft into a hollow shaft and passing the signal wire for connecting the imaging unit with the operation unit through the hollow, the connection can be achieved without mechanical contact points.

Further, according to an embodiment of the invention, the initial setting of the zoom lens 10 toward the wide-angle is performed when the power is turned on, and controlling is done to increase zoom magnification of the zoom lens 10 when the relative rotation between the operation unit 102 and imaging unit 102 is detected by the rotation detecting means 510. By this, even if deterioration in precision is caused in the zoom lens due to vibration, etc., the deterioration can be corrected by the resetting of the initial setting of the zoom lens 10 toward the wide-angle side performed upon turning on the power, and in addition, as zoom magnification is increased from the wide-angle side when shooting, if the increasing of magnification is stopped at a desired magnification, adjustment of magnification is not necessary. Therefore, an electronic camera of good usability can be provided.

By providing a means to turn on the power of the electronic camera by the user, and by composing such that operation that is started by the turning on of the power is started by receiving the signal from the detecting means for detecting the relative rotation between the imaging unit and operation unit or by the means to turn on the power, the power is turned on automatically when the imaging unit is rotated to prepare for shooting before the camera is activated, and the user turns on the power when the imaging unit is rotated after the camera is activated. Therefore, an electronic camera of good usability can be provided.

By allowing to select the controlling of setting the zoom lens toward the wide-angle or the controlling of increasing zoom magnification of the zoom lens depending on the case that the imaging unit is rotated so that the lens window is in the display side(when shooting a self-portrait) or the case that the imaging unit is rotated so that the lens window is in the opposite side of the display(when shooting other than a self-portrait) by detecting the relative rotation of the imaging unit to the operation unit by means of the detecting means thereof, zoom magnification is increased from the wide-range side and can be stopped at a desired magnification whereby adjustment of magnification is not required when shooting a self-portrait, and when shooting other than a self-portrait, even if the zoom lens is deteriorated in precision due to vibration, etc., the deterioration can be corrected by the resetting of the initial setting of the zoom lens toward the wide-angle side. Therefore, an electronic camera of good usability can be provided.

Further, allowing to select the controlling of setting the zoom lens toward the wide-angle or the controlling of increasing zoom magnification of the zoom lens depending on the case that the imaging unit is rotated so that the lens window is in the display side(when shooting a self-portrait) or the case that the imaging unit is rotated so that the lens window is in the opposite side of the display(when shooting other than a self-portrait) by detecting the relative rotation of the imaging unit to the operation unit by means of the detecting means thereof, whether to increase or decrease zoom magnification can be freely selected depending when shooting a self-portrait or when shooting other than a self-portrait. Therefore, an electronic camera of good usability can be provided.

By providing the memorizing means to store said zoom magnification and allowing the control means to change said zoom magnification according to the zoom magnification memorized in said memorizing means, shooting is done with optimum zoom magnification so that the user does not need to be concerned about zoom magnification.

Said control means allows shooting to be done with optimum magnification without user's operation by controlling so that said increasing of zoom magnification is stopped at the predetermined magnification.

Further, said control means calculates the focal distance of the zoom lens using the distance from the camera to the subject to be shot calculated based on the signal from the focusing means of the zoom lens and the predetermined magnification and allows to stop changing zoom magnification at the calculated focal distance, so that shooting can be done keeping the image on the display always to a certain size either when shooting a self-portrait with the camera held by the hand of the user or fixed to a tripod. Therefore, an electronic camera of very good usability can be provided.

It is possible to shoot with a magnification of user's taste by providing in the operation unit the means to give a signal to stop changing of zoom magnification forcibly in order to determine zoom magnification by hand operation not to allow magnification to be determined automatically to the predetermined magnification.

Further, by providing in the operation unit the means to select the controlling with which the changing of zoom magnification by said control means is stopped at the predetermined magnification or the controlling in which the changing of zoom magnification by said control means is stopped forcibly according to the signal from the means to stop changing of zoom magnification forcibly, the user can shoot a self-portrait freely selecting either of said controlling.

The foregoing embodiments shall be interpreted as illustrative not as limitative of the invention and a variety of improvements or modifications are possible in the scope of substance of the invention. For example, although with the foregoing embodiments the predetermined zoom magnification memorized in the memory is read out when proceeding to automatic setting of zoom magnification in the case of self-portrait shooting, it is suitable instead to compose so that a specific image is selected among the images presented on the display and zoom magnification is changed to present the specific image with a desired size proportion on the display.

The size proportion on the display can be determined by the user.

The image to be specified can be selected by the brightness or color of the image when the image is specified, and when the brightness or color has changed, they can be specified as needed and zoomed to match with the predetermined magnification.

What is claimed is:

1. An imaging apparatus having an operation unit which is provided with a display and an imaging unit which is provided with a flash unit and a zoom lens, the imaging unit being connected rotatably to said operation unit by a hinge mechanism and images photographed being sent to said display, wherein the front part of the imaging unit where a lens window is positioned is extended toward the operation unit to form a protruded portion for mounting a flash unit, and the distance to the rotation center of the hinge mechanism from the front side (lens window side) is greater than that from the rear side of the unit, and wherein said distance from the lens window side of the imaging unit to the rotation center of the hinge mechanism is determined to be a length so that the viewing field on the display is not constricted by the presence of the protruded portion in front of the display when the lens window of the imaging unit is turned to the display side of the operation unit;

wherein said hinge mechanism comprises a hinge plate of imaging unit side, a hinge shaft fixed to said hinge plate of imaging unit side and having a flange on which a pattern is provided for detecting the rotation angle of the hinge shaft, a hinge plate of operation unit side fixed to the operation unit, the hinge plate supporting the hinge shaft so that the hinge shaft is rotatable and prevented from slipping out from the hinge plate, an elastic member placed between the flange and hinge plate of operation unit side, and a photoelectric device for detecting the relative rotation angle of the imaging unit to the operating unit by sensing the pattern provided on the flange to detect the rotation angle of the imaging unit relative to the operating unit can be detected.

2. The imaging apparatus according to claim 1, wherein concaves are provided on the flange of the hinge shaft of the hinge mechanism at a certain angle spacing, a circular spring is used as said elastic member, and protrusions are formed on the circular spring so that the protrusions are engaged into the concaves to allow the imaging unit to be held in position.

3. The imaging apparatus according to claim 2, wherein said circular spring has reinforcement portions on the back of the protrusions.

4. The imaging apparatus according to claim 1, wherein is provided a control means which performs controlling of performing initial setting of the zoom lens toward a wide-angle side when the power is turned on and controlling of increasing zoom magnification of the zoom lens in accordance with the output of the detecting means for detecting the relative rotation angle of the imaging unit to the operation unit.

5. The imaging apparatus according to claim 1, wherein is provided a control means which performs controlling to set the zoom lens toward a wide-angle side or controlling to change to increase zoom magnification of the zoom lens selectively depending on whether the output of the detecting means for detecting the rotation angle of the imaging unit relative to the operation unit detected that the lens window is turned to the display surface side of the display or detected that lens window is turned to opposite side to the display surface.

6. The imaging apparatus according to claim 1, wherein is provided a control means which performs selectively controlling of increasing zoom magnification of the zoom lens or controlling of decreasing zoom magnification of the zoom lens in accordance with the output of the detecting means for detecting the relative rotation angle of the imaging unit to the operation unit detected that the lens window is turned to the display surface side of the display and with the output thereof detected that lens window is turned to opposite side to the display surface.

7. The imaging apparatus according to any one of claim 4 to 6, wherein a memorizing means to store said zoom magnification is provided, and said control means performs controlling of zoom magnification to change it according to the zoom magnification stored in said memorizing means.

8. The imaging apparatus according to any one of claim 4 to 6, wherein said control means calculates the focal distance of the zoom lens using the distance from the imaging apparatus to the subject to be shot calculated based on the signal from the focusing means of the zoom lens and the predetermined magnification and allows to stop changing zoom magnification at the calculated focal distance.

* * * * *